(12) United States Patent
Otsuji et al.

(10) Patent No.: US 10,345,827 B2
(45) Date of Patent: Jul. 9, 2019

(54) MOTOR CONTROL DEVICE AND MOTOR CONTROL METHOD, CONTROL SYSTEM AND LOCATION ESTIMATION METHOD USED IN CONTROL SYSTEM

(75) Inventors: Jun Otsuji, Nagano (JP); Akihiro Ito, Nagano (JP); Hirokazu Watanabe, Nagano (JP); Hideyuki Odagiri, Nagano (JP)

(73) Assignee: NIDEC SANKYO CORPORATION, Nagano (JP)

(*) Notice: Subject to any disclaimer, the term of this patent is extended or adjusted under 35 U.S.C. 154(b) by 820 days.

(21) Appl. No.: 13/814,576

(22) PCT Filed: Aug. 6, 2011

(86) PCT No.: PCT/JP2011/067994
§ 371 (c)(1),
(2), (4) Date: Nov. 26, 2013

(87) PCT Pub. No.: WO2012/020714
PCT Pub. Date: Feb. 16, 2012

(65) Prior Publication Data
US 2014/0070752 A1 Mar. 13, 2014

Related U.S. Application Data

(60) Provisional application No. 61/371,713, filed on Aug. 8, 2010.

(30) Foreign Application Priority Data

Feb. 1, 2011 (JP) .................................. 2011-019448
Aug. 5, 2011 (JP) .................................. 2011-171488

(51) Int. Cl.
*H02P 6/16* (2016.01)
*G05D 3/20* (2006.01)
(Continued)

(52) U.S. Cl.
CPC ............... *G05D 3/20* (2013.01); *G05B 19/19* (2013.01); *G05B 2219/41142* (2013.01)

(58) Field of Classification Search
CPC ...... H02P 21/06; H02P 29/022; H02P 23/0036
See application file for complete search history.

(56) References Cited

U.S. PATENT DOCUMENTS 4,786,847 A * 11/1988 Daggett ................. B25J 9/1633
318/568.2
5,471,940 A * 12/1995 Wakana ................. D05B 69/22
112/220
(Continued)

FOREIGN PATENT DOCUMENTS

JP 3-125912 A 5/1991
JP 5-30776 A 2/1993
(Continued)

OTHER PUBLICATIONS

International Search Report for International Application No. PCT/JP2011/067994, dated Nov. 8, 2011, with English translation.
(Continued)

*Primary Examiner* — Bickey Dhakal
*Assistant Examiner* — Charles S Laughlin
(74) *Attorney, Agent, or Firm* — Cantor Colburn LLP

(57) ABSTRACT

A motor control device may include a position command output means, a first subtraction means that calculates and outputs a position deviation, a position control means, a second subtraction means that calculates and outputs a position deviation, a speed control means that outputs a torque command, a limiter limits the level of the torque command, a motor drive means, and a voltage fluctuation detection means. When the voltage fluctuation detection means detects that the voltage of said power source has dropped below a predetermined reference level, either the position command output means varies the position com-
(Continued)

mand so as to reduce the rotational speed of the motor and/or said position control means limits said speed command to be output.

7 Claims, 12 Drawing Sheets

(51) Int. Cl.
   *G05B 19/19* (2006.01)
   *H02M 5/458* (2006.01)

(56) References Cited

U.S. PATENT DOCUMENTS

| | | | | |
|---|---|---|---|---|
| 5,721,546 | A | * | 2/1998 | Tsutsumishita .... G01D 5/24409 341/116 |
| 7,531,981 | B2 | * | 5/2009 | Iwashita ............. G05B 19/404 318/560 |
| 2008/0125904 | A1 | * | 5/2008 | Osaki ................... G05B 19/402 700/170 |
| 2009/0079379 | A1 | * | 3/2009 | Abe ....................... G05B 11/28 318/568.24 |

FOREIGN PATENT DOCUMENTS

| | | |
|---|---|---|
| JP | 5-333931 A | 12/1993 |
| JP | 9-179632 A | 7/1997 |
| JP | 10-309683 A | 11/1998 |
| JP | 2001-56711 A | 2/2001 |
| JP | 2008-67525 A | 3/2008 |
| JP | 2008067525 A * | 3/2008 |

OTHER PUBLICATIONS

USPTO Office Action corresponding to U.S. Appl. No. 14/965,364; dated May 5, 2017.

* cited by examiner

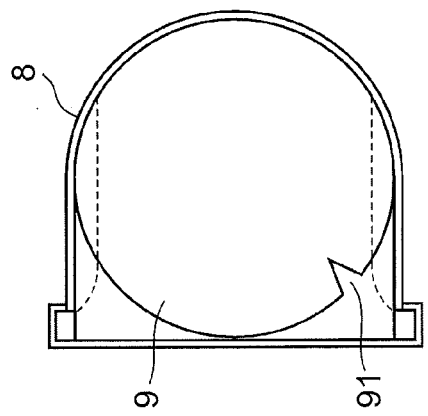
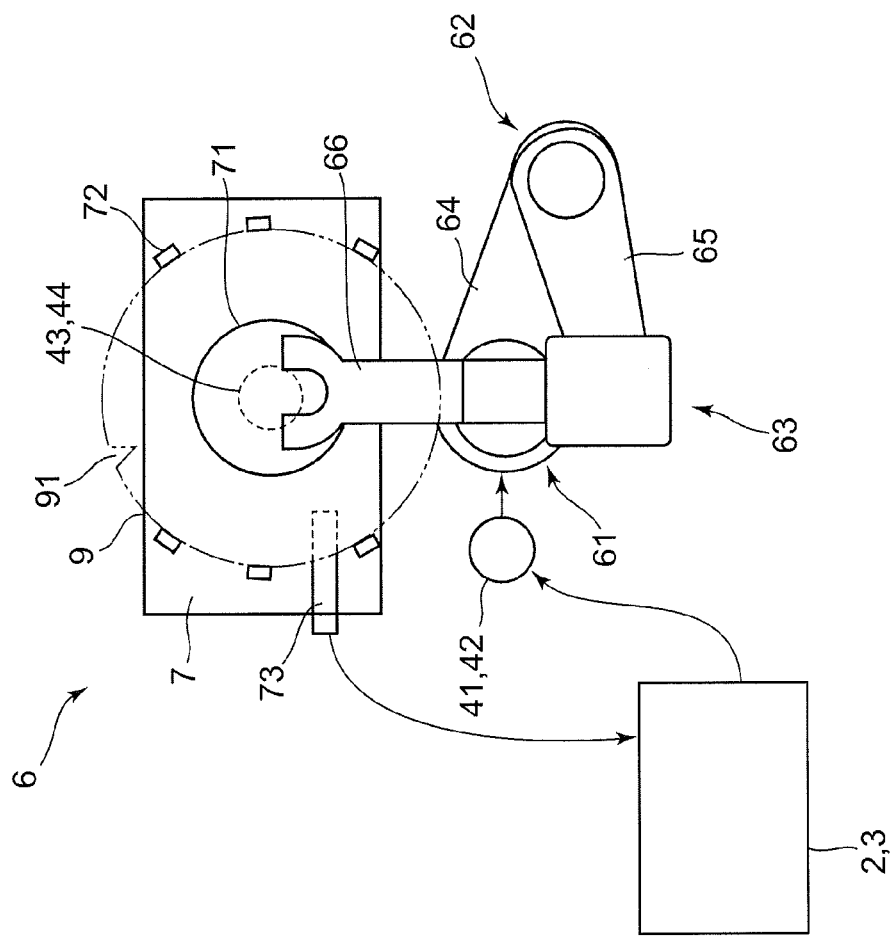
FIG. 15

MOTOR CONTROL DEVICE AND MOTOR CONTROL METHOD, CONTROL SYSTEM AND LOCATION ESTIMATION METHOD USED IN CONTROL SYSTEM

CROSS REFERENCE TO RELATED APPLICATIONS

This is the U.S. national stage of application No. PCT/JP2011/067994, filed on 6 Aug. 2011. Priority under 35 U.S.C. § 119(a) and 35 U.S.C. § 365(b) is claimed from Japanese Application Nos. 2011-019448, filed 1 Feb. 2011, and 2011-171488, 5 Aug. 2011, the disclosure of which is also incorporated herein by reference.

FIELD OF INVENTION

The present invention relates to a motor control device for controlling a motor that operates a robot. Also the present invention relates to a motor control method for controlling a motor that operates a robot. Further, the present invention relates to a control system that can be applied to a drive system and a rotation system such as a robot and a numerical control, and a location estimation method that is used in the control system.

Conventionally known is a motor control device for controlling a DC motor (including a direct current motor, a DC brushless motor) that operates a robot (see Patent Reference 1, for example). In a motor control device described in Patent Reference 1, the rotational position of a motor is detected by a position detector, and the rotation speed of the motor is detected by a speed detector. Also, a subtractor calculates the position deviation by subtracting the output by the position detector from the position command, the position controller converts the position deviation into the speed command, an adder-subtractor adds the output from a feed forward controller to the speed command and subtracts the output by the speed detector, and an PI controller converts the output from the adder-subtractor into the torque command. Further, the torque command to be output from the PI controller is put the limit by a limiter, and then a motor driver drives the motor based on the torque command.

In the field of robots and numerical control devices, a control system is generally used to drive those devices. For example, when a robot is designed to perform various operations such as transporting works or soldering, a control system issues an operation command (a position command) to a servo controller that servo-controls the motor that rotates the joints of the robot. Also, the joints of the robot have encoders to measure the rotational angle of the motor; a host controller performs a servo-control through the servo controller while sampling the deviation between the target value and the actual measurement value by referring to the position data (such as the rotational angle measurement value, etc.) sent by the encoders as feedback.

The above-mentioned feedback position data is sampled at a predetermined sampling cycle; therefore, the position at the time other than at the sampling cycle cannot be known, and thus the sampling cycle is a limitation to the position resolution. However, high position resolution is an important factor for high-speed/highly-precise position control; therefore, it is necessary to estimate the position in order to increase the position resolution.

In a robot control device described in Patent Reference 2, even when the measurement cycle of an absolute encoder and the servo cycle are asynchronous, the position pulse synchronized with the servo cycle is estimated by an extrapolation operation to increase the position resolution.

More specifically described, in the robot control device disclosed in Patent Reference 2, a feedback position X is sampled first. Then, the sampling cycle is calculated in the relationship with the nearest sampling time to obtain the difference in the feedback position, and also the difference of the two feedback positions is divided by the sampling cycle to obtain the rate of change (A) of the feedback position. Also, the time difference (B) from the sampling time to the servo command time is calculated. Finally, the value obtained by multiplying the rate of change (A) by the time difference (B) is added to the above-mentioned feedback position X to estimate the position at the time at which the servo command was output.

RELATED ART

Patent Reference

Patent Reference 1: Japanese Unexamined Patent Application Publication H10-309683
Patent Reference 2: Japanese Unexamined Patent Application Publication H5-333931

SUMMARY OF THE INVENTION

Problems to be Solved

In a DC motor controlled by a motor control device described in Patent Reference 1, a torque in proportion to the current flowing through a drive coil can be obtained. The current flowing through the drive coil is proportional to the voltage that is applied to a motor driver when static; therefore, it is possible to control the torque of the motor by controlling the voltage applied to the motor driver. At that time, when the original voltage to be applied to the motor driver drops, the torque command may be increased to prevent the torque from decreasing. However, the torque command cannot be increased more than a predetermined level due to physical restrictions of the motor driver, etc. For this reason, if the original voltage to be applied to the motor driver drops dramatically, not only may the robot not be operated for desired motions, but also a so-called windup phenomenon may occur under the influence of an integrating function that the PI controller owns, causing to the robot to show unstable behaviors such as oscillating movements.

Therefore, when an instantaneous voltage drop, a phenomenon in which the original voltage drops instantaneously, occurs, for example, the motor is forced to stop before the robot shows unstable behaviors so that damage to the robot and works can be prevented. However, if the motor is halted to stop the robot when an instantaneous voltage drop occurs, a long recovery time is required to restart the robot, degrading productivity. When a robot is used in a factory in particular where the electric power supply is poor, productivity will be greatly decreased if the robot is stopped every time an instantaneous voltage drop occurs.

Therefore, an object of the present invention is to provide a motor control device capable of operating a robot properly without stopping the motor, which operates the robot, even when an instantaneous voltage drop occurs and the voltage of the power source falls. Also, another object of the present invention is to provide a motor control method capable of operating a robot properly without stopping the motor, which operates the robot, even when an instantaneous voltage drop occurs and the voltage of the power source falls.

The robot control device described in Patent Reference 2 has a problem of poor response to the speed fluctuation of the motor because the feedback position difference is divided by the sampling cycle to obtain the rate of change A, thus the position estimation is performed only by a simple extrapolation operation. In this case, the position estimation system can be improved by shortening the measuring cycle of the encoder; however, this requires shortening the communication cycle and increasing the processing speed of the CPU, resulting in increased cost.

Therefore, the present invention is designed considering such problems, and its object is to provide a control system capable of precisely responding to the speed fluctuation of a motor without shortening the sampling cycle, and to provide a position estimation method used in the control system.

Means to Achieve Objects

To achieve the above-mentioned objects, a motor control device of the present invention for controlling a motor which operates a robot, comprises a position command output means for outputting the position command to control a motor, a first subtraction means for calculating the position deviation based on the rotational position which is calculated based on the output from a rotation detection means that generates a pulse signal each time the motor rotates at a predetermined angle and the position command, a position control means for converting the position deviation into a speed command and outputting it, a second subtraction means for calculating the speed deviation based on the rotational speed that is calculated based on the output from the rotation detection method and the speed command, a speed control means for converting the speed deviation into a torque command and outputting it, a limiter that outputs the torque command 'as is' when the value of the torque command is below a predetermined limit value and also outputs the torque command of the limit value when the value of the torque command is above the limit value, a motor drive means for driving the motor based on the torque command from the limiter, and a voltage fluctuation detection means for detecting the voltage fluctuation of the power source that applies the voltage to the motor drive means; wherein when the voltage fluctuation detection means detects that the power voltage of the power source has dropped below a predetermined reference value, either the position command output means varies the position command so as to reduce the rotation speed of the motor and/or the speed command to be output is limited by the position control means.

In the motor control device of the present invention, once the voltage fluctuation detection means detects that the power voltage has dropped below the predetermined reference value, the position command output means varies the position command so as to reduce the rotation speed of the motor and the position control means limits the speed command to be output. Also, in the present invention, once the voltage fluctuation detection means detects that the power voltage has dropped below the reference value, the position command output means varies the position command to reduce the rotation speed of the motor or the position control means limits the speed command to be output.

Therefore, in the present invention, even when an instantaneous voltage drop occurs and the power voltage falls below the reference value, it is possible to suppress the increase in the value of the speed command to suppress the increase in the speed deviation. Therefore, in the present invention, even when an instantaneous voltage drop occurs in which the power voltage drops below the reference value, the rotation speed of the motor is reduced to properly control the motor so that the robot can perform desired operations, and at the same time, a windup phenomenon is prevented from occurring, preventing unstable behaviors of the robot. Consequently, even when an instantaneous voltage drop occurs and the power voltage of the power source falls, the robot can be properly operated without halting the motor.

When, once an instantaneous voltage drop occurs and the power supply voltage falls below the reference value, only the position command is varied, the increase in position deviation to be output from the first subtraction means can be suppressed; therefore, an abrupt fluctuation of the speed command that happens when the power voltage is recovered above the reference value to return the position command to the original state can be suppressed. Also, the influence of the fluctuation of the position command appears in the position command with a slight delay; in this case, when the power supply voltage drops below the reference value, it will be difficult to suppress the increase in the value of the speed command within a short period of time. Also, when an instantaneous voltage drop occurs, the power supply voltage drops below the reference value and only the speed command is limited, it is possible to suppress the increase in the value of the speed command within a short period of time, but the position deviation to be output from the first subtraction method may increase; therefore, when the power supply voltage is recovered above the reference value and the limit on the speed command is cancelled, the value of the speed command may become large abruptly, which accelerates the motor suddenly and which in turn operates the robot erratically.

For this reason, it is preferred in the present invention that, when the voltage fluctuation detection method detects that the power supply voltage has dropped below the reference value, the position command output means varies the position command to reduce the rotational speed of the motor and the position control means limits the speed command to be output. Then, even if an instantaneous voltage drop occurs and the power supply voltage falls below the reference value, the problems that occur when only the position command is varied or when only the speed command is limited, can be both solved with this configuration.

In the present invention, it is preferred that, once the voltage fluctuation detection method detects that the power supply voltage has recovered above the reference value, the position command output means delay the position command first to minimize the position deviation to be output from the first subtraction means and the position command output means return the position command to the original state at the position after the position command output means has delayed the position command or the position control means cancel the limit on the speed command to be output. This configuration can suppress the value of the speed command from a sudden hike when, after the power supply voltage is recovered above the reference value, the position command is returned to the original state or the limit on the speed command is cancelled. Therefore, when, after the power voltage is recovered above the reference value, the position command is returned to the original state or the limit on the speed command is cancelled, the motor is kept from a sudden acceleration, preventing abrupt motion of the robot.

In the present invention, it is preferred that, when the voltage fluctuation detection means detects that the power voltage has dropped below the reference value and the position command output means fluctuates the position command to reduce the rotational speed of the motor, once the voltage fluctuation detection means detects that the power voltage has recovered above the reference value, the position command output means delays the position command to minimize the position deviation to be output from the first subtraction means, and then the position command output means returns the position command to the original state at the position after the position command output means has delayed the position command. With this configuration, a sudden acceleration of the motor can be prevented when the position command is returned to the original state after the power voltage is recovered above the reference value; as a result, abrupt motion of the robot can be prevented.

Also, in the present invention, it is preferred that, when the voltage fluctuation detection means detects that the power voltage has dropped below the reference value and the position control means puts a limit on the speed command to be output, once the voltage fluctuation detection means detects that the power voltage is recovered beyond the reference value, the position command output means delays the position command to minimize the position deviation to be output from the first subtraction means, and then the position control means cancels the limit on the speed command to be output. With this configuration, a sudden acceleration of the motor can be prevented when the limitation on the speed command is cancelled after the power voltage is recovered above the reference value; as a result, abrupt motion of the robot can be prevented.

To achieve the above object, a motor control method of the present invention for controlling a motor that operates a robot is featured by the fact that a position deviation is calculated based on the position command to control the motor and the rotational position of the motor that is actually measured; the position deviation is converted to a speed command; a speed deviation is calculated based on the speed command and the rotational speed of the motor that is actually measured; the speed deviation is converted to a torque command; when the value of the torque command is below a predetermined limit level, the motor is driven based on the torque command as is; when the value of the torque command is above the limit level, the motor is driven based on the torque command having the limit value as its value; when it is detected that the power voltage of the motor has dropped below the predetermined reference value, the position command is varied and/or the speed command is limited so as to reduce the rotational speed of the motor.

In the motor control method of the present invention, when it is detected that the power voltage of the motor has dropped below the predetermined reference value, the position command is varied and the speed command is limited to reduce the rotational speed of the motor. Also, in the motor control method of the present invention, when it is detected that the power voltage of the motor has dropped below the reference value, the position command is varied or the speed command is limited to reduce the rotational speed of the motor. Therefore, in the present invention, when an instantaneous voltage drop occurs and the power supply voltage drops below the reference value, the increase in the value of the speed command can be suppressed to suppress the increase in the speed deviation. Thus, in the present invention, even when an instantaneous voltage drop occurs and the power voltage drops below the reference value, the rotational speed of the motor is reduced to properly control the motor so that a robot can perform desired operations; also, the windup phenomenon is prevented from occurring so that the robot can be prevented from showing unstable behavior. Consequently, as a motor is controlled by the motor control method of the present invention, even when an instantaneous voltage drop occurs and the power voltage drops, the robot can be properly operated without stopping the motor.

Also, to achieve the above objects, the present invention provides the following:

A control system comprising a motor for driving a body to be controlled, a sensor for detecting the position data of the body to be controlled based on the rotational angle of the motor at a predetermined cycle, a servo control unit for servo-controlling the motor, a position control unit for issuing an operation command (a position command) to the servo control unit; wherein the position control unit is equipped with a command generating means that generates an operation command of the servo control unit, a position data storage means that stores the position data obtained from the sensor together with the obtaining time, and a position estimating means that estimates the position of the body to be controlled at an arbitrary time, based on the position data in the predetermined cycle; by the position estimation method, the position f(t) of the body to be controlled at time t is expressed by a polynomial based on the position data, and the position of the body to be controlled at an arbitrary time is estimated by a polynomial interpolation.

According to the present invention, by the position estimation method, the position f(t) of the body to be controlled at time t is expressed by a polynomial based on the position data, and the position at an arbitrary time is estimated by a polynomial interpolation; therefore, can respond precisely to the load fluctuation and the speed fluctuation of the motor without shortening the sampling cycle.

In other words, by the position estimation method, the position f(t) of the body to be controlled at time t is expressed by a polynomial based on the position data which has been stored in the position data storage means together with the [obtaining] time; therefore, the position can reliably be expressed by a function of t even when the motor speed fluctuates, and the position at an arbitrary time can precisely be estimated without shortening the sampling cycle. Also, the position estimation method estimates the position of the body to be controlled by using the feedback position data; therefore, [the position estimation] is hardly affected by the load fluctuation of the motor, precisely estimating the position at an arbitrary time.

The robot control system wherein the position estimating means expresses the position f(t) of the body to be controlled at the time t by a polynomial expression of Formula 1 below, where the coefficient a of the polynomial is obtained by Formula 2 below based on the position data $y_i$ and the obtaining time $t_i$ stored in the position data storage means to estimate the position of the body to be controlled at an arbitrary time.

$$f(t) = \sum_{i=0}^{n} a_i t^i \qquad \text{[Formula 1]}$$

$$\theta^T = [W^\wedge T W]^{-1} W^T X \qquad \text{[Formula 2]}$$

$X = (y_0 y_1 \ldots y_n), \theta = (a_0 a_1 \ldots a_n),$ $$W = \begin{pmatrix} t_0^n & t_0^{n-1} & \ldots & t_0^0 \\ \ldots & \ldots & & \ldots \\ t_n^n & t_n^{n-1} & \ldots & t_n^0 \end{pmatrix}$$

According to the present invention, the position f(t) of the body to be controlled at an arbitrary time t can be expressed by a polynomial expression based on the position data $y_i$ and the obtaining time $t_i$ stored in the position data storage means; even when the motor speed fluctuates, the position of the body to be controlled can precisely be estimated.

A robot control system wherein the position estimation method estimates the position of the body to be controlled at an arbitrary time by using a third-order polynomial.

According to the present invention, the position of the body to be controlled is expressed by using a third-order polynomial; therefore, even when the speed of the motor fluctuates during acceleration or deceleration, the position of the body to be controlled can accurately be expressed by t function, thus precisely estimating the position of the body to be controlled. Also, since the calculation to obtain the third-order polynomial is not a large operation load, the operation load for a position estimation can be minimized.

A control system wherein the position estimating means estimates the position of the body to be controlled at an arbitrary time, based on the position data taken near the arbitrary time at which the position of the body to be controlled is estimated.

According to the present invention, the position data taken near the arbitrary time at which the position will be estimated is used; therefore, the proper position data for a position estimate can be selected from the position data stored in the position data storage means to estimate the position of the body to be controlled by a third-order polynomial; even when the motor speed fluctuates, the position of the body to be controlled can precisely be estimated and the operation load can be reduced.

The control system further comprising a mark sensor for detecting a positioning mark provided to the body to be controlled, wherein the position estimation method estimates the position of the body to be controlled at the time at which the mark sensor has detected the positioning mark.

According to the present invention, the position of the body to be controlled at the time at which the sensor has detected the positioning mark can be estimated; therefore, the position of the body to be controlled can precisely be aligned.

A position estimation method, in a control system having a sensor that detects the position data of the body to be controlled, taken based on the rotational angle of the motor, at the predetermined cycle, a servo control unit that servo-controls the motor, and a position control unit that issues an operation command to the servo control unit, wherein the position control unit generates an operation command to be sent to the servo control unit, stores the position data obtained from the sensor together with the obtaining time, expresses the position f(t) of the body to be controlled at time t by a polynomial based on the position data, and estimates the position of the body to be controlled at an arbitrary time by a polynomial interpolation.

According to the present invention, the position control unit generates an operation command to be sent to the servo control unit, stores the position data obtained from the sensor together with the obtaining time, expresses the position f(t) of the body to be controlled at time t by the polynomial based on the position data, and estimates the position of the body to be controlled at an arbitrary time by a polynomial approximation; therefore, can respond precisely to the load fluctuation or the speed fluctuation of the motor without shortening the sampling cycle.

In other words, the position control unit expresses the position f(t) of the body to be controlled at time t by a polynomial, based on the position data stored with the [obtaining] time; therefore, even when the speed of the motor fluctuates, the position can be reliably expressed as a t-function, and the position at the arbitrary time can precisely be estimated without shortening the sampling cycle. Also, the position control unit estimates the position of the body to be controlled by using the feedback position data; therefore, is hardly affected by the load fluctuation of the motor, and thus the position at an arbitrary time can precisely be estimated.

Effects of the Invention

As described above, in the motor control device of the present invention, even when an instantaneous voltage drop occurs and the power supply voltage falls, the robot can properly be operated without stopping the motor that operates the robot. Also, if the motor that operates the robot is controlled by the motor control method of the present invention, even when an instantaneous voltage drop occurs and the power supply voltage drops, the robot can properly be operated without stopping the motor.

As described above, the control system of the present invention and the position estimation method applied in the control system can respond precisely to the speed fluctuation of the motor without shortening the sampling cycle to perform a highly precise position estimation without reducing the speed of the motor.

BRIEF DESCRIPTION OF DRAWING

FIG. 15 A diagram of a robot in which the robot control system of the second embodiment of the present invention can be applied.

DETAILED DESCRIPTION OF THE PREFERRED EMBODIMENTS

Figure 1:
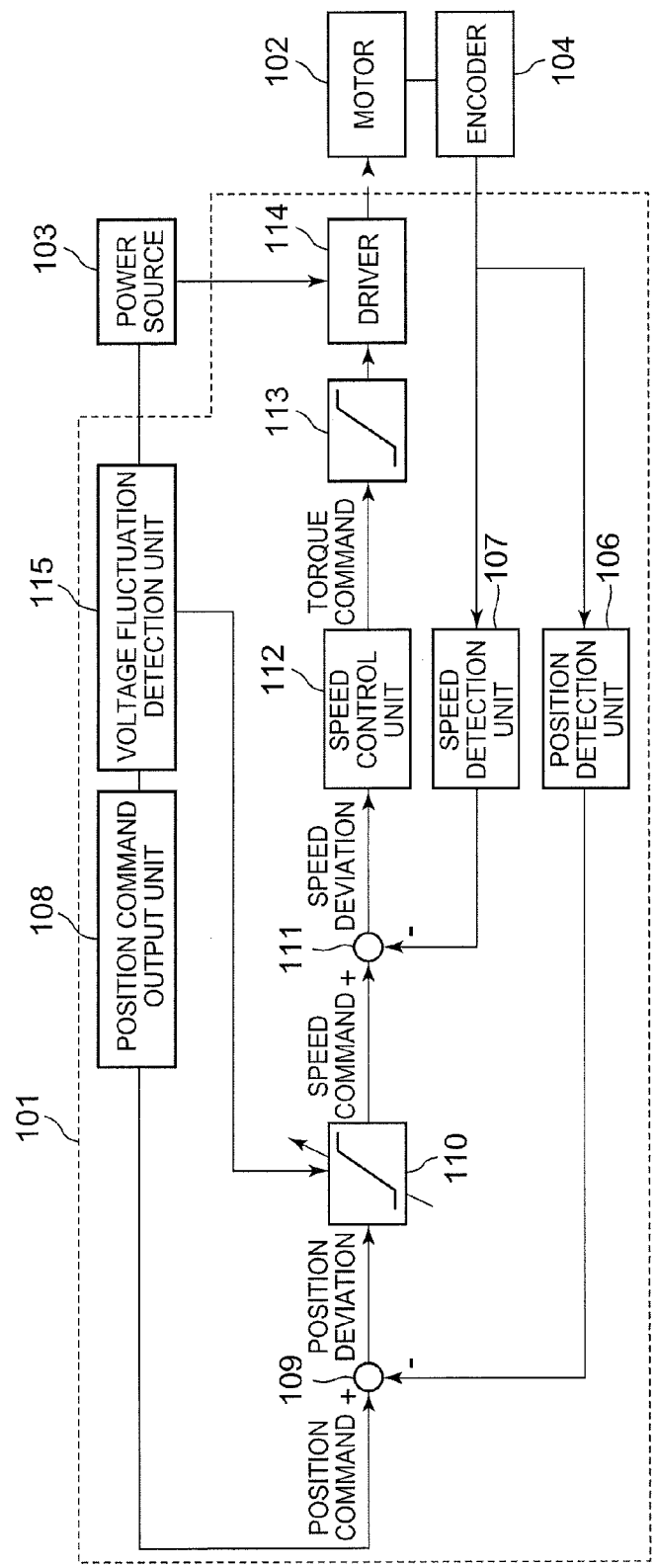
FIG. 1 A block diagram showing the configuration of a motor control device of a first embodiment of the present invention.

First Embodiment: Motor Control and Motor Control Method

A first embodiment of the present invention is described hereinafter referring to the drawings.

Configuration of Motor Control Device

Figure 2:
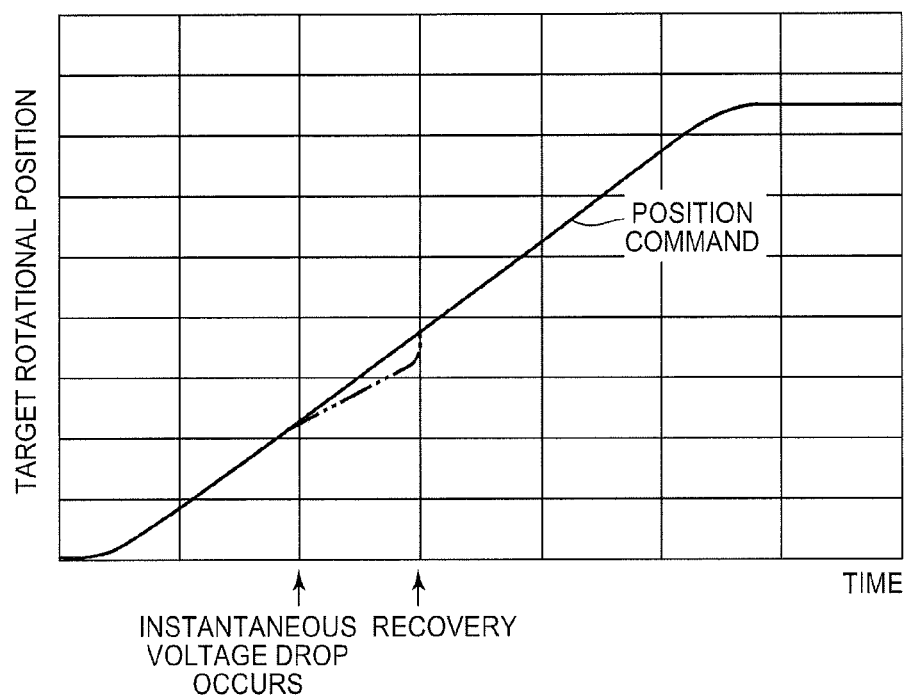
FIG. 2 A graph of an example of a position command that is output from a position command output unit shown in FIG. 1.
Figure 3:
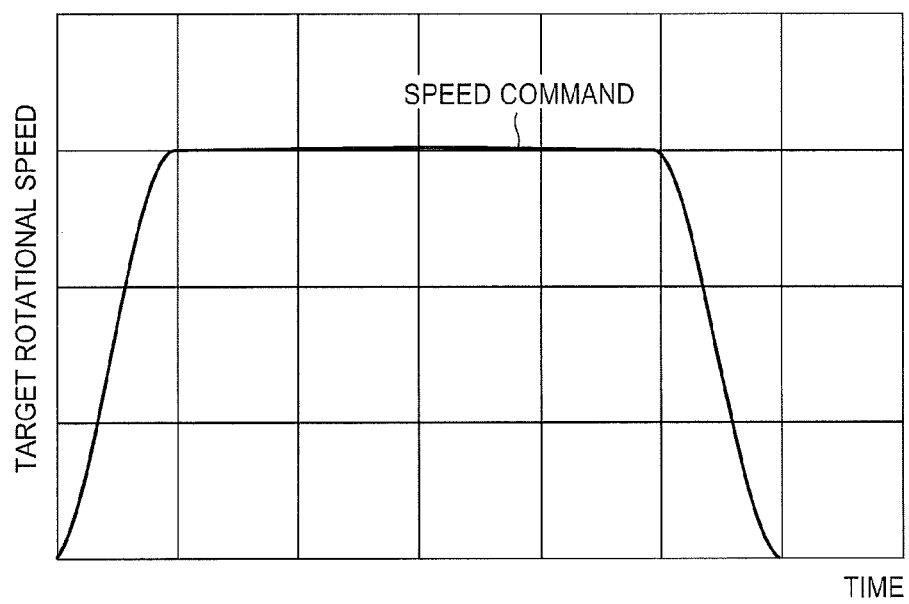
FIG. 3 A graph of an example of a speed command that is output from a position control unit.
Figure 4:
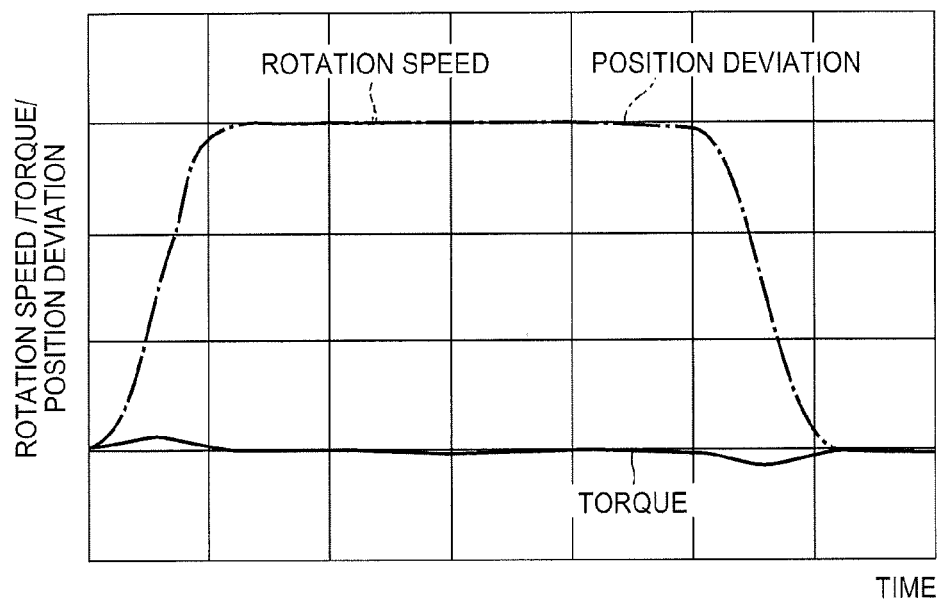
FIG. 4 A graph showing an example of a position deviation that is output from a subtraction unit shown in FIG. 1 and an example of the rotational speed and the torque of the motor shown in FIG. 1.

FIG. 1 is a block diagram of a motor control device 101 of the first embodiment of the present invention. FIG. 2 is a graph showing an example of a position command that is output from a position command output unit shown in FIG. 1. FIG. 3 is a graph showing an example of a speed command that is output from the position control unit 110 shown in FIG. 1. FIG. 4 is a graph showing an example of a position deviation that is output from the subtraction unit shown in FIG. 1 and an example of the rotational speed and the torque of the motor 102 shown in FIG. 1.

The motor control device 101 of this embodiment is a device for controlling the motor 102 that operates an industrial robot. The motor 102 is a DC servo motor, and operates an arm of the industrial robot, for example. As shown in FIG. 1, a power source 103 of the motor 102 is connected to the motor control device 101. Also, an encoder 104 is arranged between the motor control device 101 and the motor 102. The encoder 104 is configured by a disc-like slit board fixed to a rotating shaft of the motor 102 and an optical sensor having a light-emitting device and a light-receiving device between which the slit board is sandwiched; the optical sensor is connected to the motor control device 101.

The motor control device 101 is configured by an operation means such as an MPU, a storage means such as a ROM, a RAM or a non-volatile storage, and an input/output means such as an I/O port. Also, the motor control device 101 is functionally equipped with a position detection unit 106, a speed detection unit 107, a position command output unit 108, a subtraction unit 109 as a first subtraction means, a position control unit 110 as a position control means, a subtraction unit 111 as a second subtraction means, a speed control unit 112 as a speed control means, a limiter 113, a driver 114 as a motor drive means, and a voltage fluctuation detection unit 115 as a voltage fluctuation detection means.

The position detection unit 106 calculates the rotational position of the motor 102, based on the output from the encoder 104. The speed detection unit 107 calculates the rotational speed of the motor 102, based on the output from the encoder 104. The position command output unit 108 outputs the position command to control the rotational speed and the rotational position of the motor 102. More specifically described, the position command output unit 108 outputs a target rotational position, which corresponds to the time elapsed since the motor 102 has started, as the position command. Plotting the elapsed time after the motor 102 started on the horizontal axis and the target rotational position on the vertical axis, the position command output from the position command output unit 108 appears as in the graph shown in FIG. 2.

The subtraction unit 109 calculates the position deviation which is calculated by subtracting the actual rotational position, which is output from the position detection unit 106, from the position command, which is output from the position command output unit 108. Plotting the elapsed time after the motor 102 started on the horizontal axis and the position deviation on the vertical axis, the position deviation that is output from the subtraction unit 109 appears as in the graph shown in FIG. 4, for example.

The position control unit 110 normally converts the position deviation, which is output from the subtraction unit 109, to a speed command and outputs it. More specifically described, the position control unit 110 outputs the target rotational speed, which corresponds to the time that has elapsed since the motor 102 started, as the speed command. Plotting the elapsed time after the motor 102 started on the horizontal axis and the target rotational speed on the vertical axis, the speed command output from the position control unit 110 appears as in the graph shown in FIG. 3, for example. At the position control unit 110, a proportional positioning control is performed.

The subtraction unit 111 calculates the speed deviation by subtracting the actual rotational speed, which is output from the speed detection unit 107, from the speed command, which is output from the position control unit 110, and outputs it. The speed control unit 112 converts the speed deviation output from the subtraction unit 111 into the torque command and outputs it. At the speed control unit 112, a PI control, which is a combination of a proportional positioning control and an integral control, is performed.

When the value of the torque command output from the speed control unit 112 is below a predetermined limit value, the limiter 113 outputs the torque command output from the speed control unit 112 as the torque command; when the value of the torque command output from the speed control unit 112 exceeds the limit value, the limiter outputs the torque command of the limit value. In other words, the upper limit value of the torque command to be output to the driver 114 is set by the limiter 113.

A power source 103 is connected to the driver 114, and the driver 114 applies the voltage to the motor 102, based on the torque command output from the limiter 113 to drive it. The rotational speed and the torque of the motor 102 driven by the driver 114 appear as in the graph shown in FIG. 4, plotting the elapsed time after the motor 102 started on the horizontal axis and the rotational speed and the torque on the vertical axis.

The voltage fluctuation detection unit 115 is connected to the power source 103 to detect voltage fluctuation of the power source 103. In this embodiment, the voltage fluctuation detection unit 115 detects an instantaneous voltage drop in which the voltage of the power source 103 falls instantaneously below the predetermined reference value. Also, the voltage fluctuation detection unit 115 is connected to the position command output unit 108 and the position control unit 110.

(Method of Controlling Motor at Instantaneous Voltage Drop)

Figure 5:
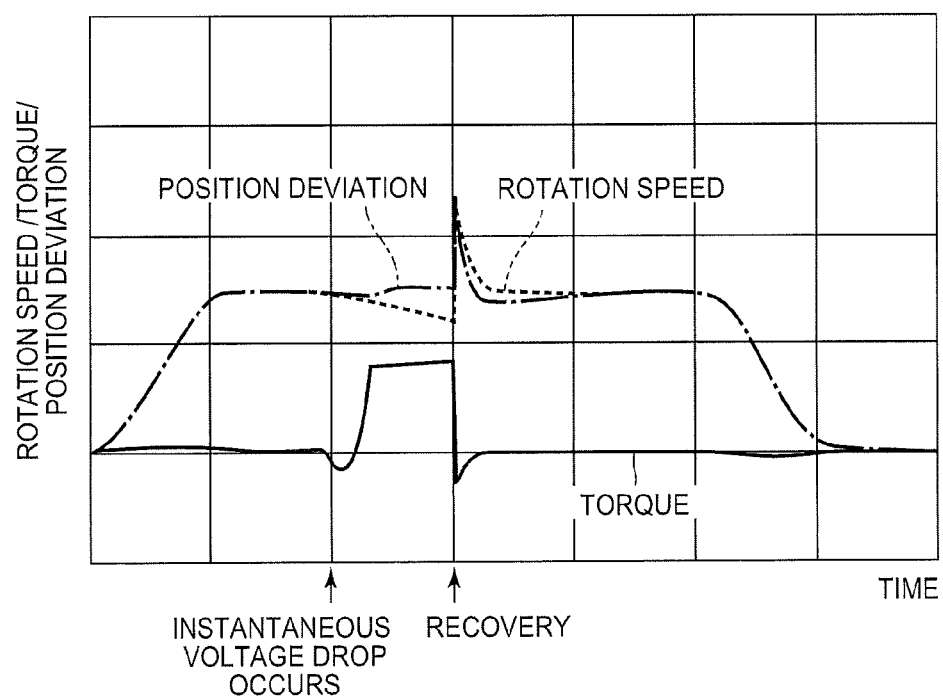
FIG. 5 An explanatory graph showing the changes in the position deviation, which will be converted to the speed command, and changes in the rotational speed and the torque of the motor when an instantaneous voltage drop occurs while the motor is being controlled by the motor control device of the first embodiment of the present invention.
Figure 6:
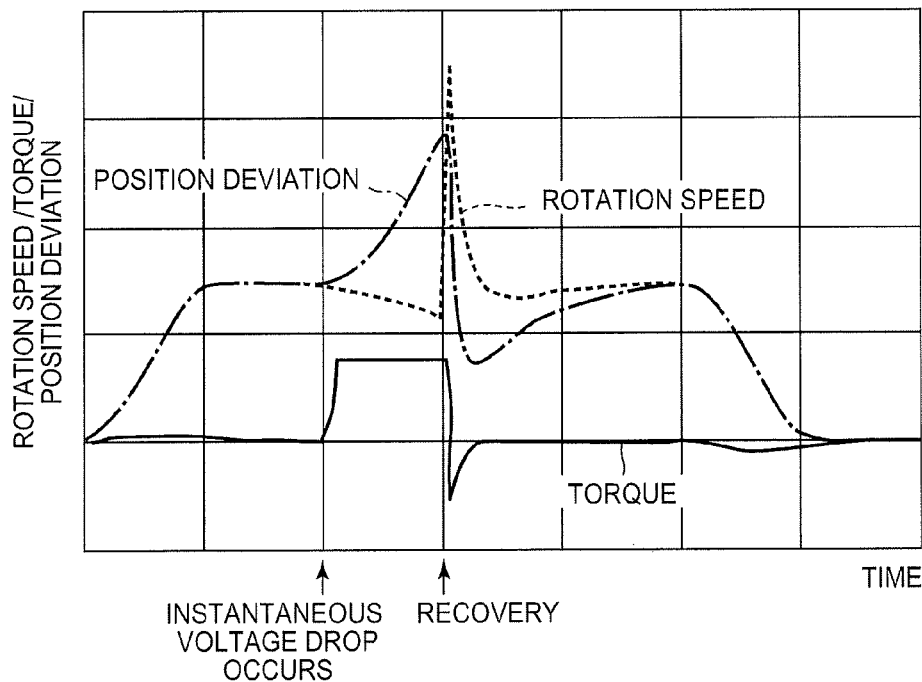
FIG. 6 An explanatory graph showing the changes in the position deviation, which will be converted to the speed command, and the changes in the rotational speed and the torque of the motor when an instantaneous voltage drop occurs while the motor is being controlled by a conventional motor control device.

FIG. 5 is a graph to explain the changes in the position deviation which will be converted to the speed command and the changes in the rotational speed and the torque of the motor 102 in the case that an instantaneous voltage drop occurs while the motor 102 is being controlled by the motor control device 101 of this embodiment of the present invention. FIG. 6 is a graph to explain the changes in the position deviation which will be converted to the speed command and the changes in the rotational speed and the torque of the motor 102 in the case that an instantaneous voltage drop occurs while the motor 102 is being controlled by a conventional motor control device.

When an instantaneous voltage drop occurs, the motor control device 101 controls the motor in the following operations. First, the voltage fluctuation detection unit 115 judges whether or not an instantaneous voltage drop has occurred. If the voltage fluctuation detection unit 115 detects that the voltage of the power source 103 has dropped below the reference value (in other words, the voltage fluctuation detection unit 115 detects an instantaneous voltage drop), the position command output unit 108 varies the position command, based on the detection result at the voltage fluctuation detection unit 115, to reduce the rotational speed of the motor 102. For example, when an instantaneous voltage drop is detected by the voltage fluctuation detection unit 115, the position command output unit 108 varies the position command as shown by the double dotted line in FIG. 2. At that time, it is preferred that the position command output unit 108 vary the position command so as to reduce the rotational speed of the motor 102 as quickly as possible as long as there is no damage to the robot or works loaded in the robot. For example, the position command output unit 108 varies the position command so as to reduce the rotational speed of the motor 102 at the same reduction rate as that during a normal deceleration of the motor 102.

When an instantaneous voltage drop is detected by the voltage fluctuation detection unit 115, the position control unit 110 limits the position deviation which will be converted to the speed command, based on the detection result of the voltage fluctuation detection unit 115. For example, the position control unit 110 locks (clamps) the position deviation measured when the instantaneous voltage drop has occurred, as the position deviation to be converted to the speed command and converts the clamped position deviation into the speed command. Alternately, the position control unit 110 varies the upper limit value of the position deviation which will be converted to the speed command according to the rotational speed of the motor 102 detected by the speed detection unit 107; also, when the position deviation output from the subtraction unit 109 is below the upper limit value, [the position control unit 110] takes that position deviation as that to be converted to the speed command; when the position deviation output from the subtraction unit 109 exceeds the upper limit value, [the position control unit 110] takes the position deviation of the upper limit as that to be converted into the speed command. As described above, a proportional positioning control is performed at the position control unit 110; therefore, when the position deviation to be converted to the speed command is limited, the speed command to be output from the position control unit 110 is also limited. In other words, when an instantaneous voltage drop is detected by the voltage fluctuation detection unit 115, the position control unit 110 limits the speed command to be output.

After the instantaneous voltage drop ends and the voltage fluctuation detection unit 115 detects that the voltage of the power source 103 has recovered above the reference value, the position control unit 110 cancels the limit on the position deviation. In other words, the position control unit 110 cancels the limit on the speed command. Also, the position command output unit 108 returns the position command to the original state. For example, the position command output unit 108 returns the position command, which has been varied to reduce the rotational speed of the motor 102, to the position command shown by the solid line in FIG. 2.

The motor control device 101 of the present invention performs the above-described operations once an instantaneous voltage drop occurs; therefore, when an instantaneous voltage drop occurs while the motor 102 is being controlled by the motor control device 101, the position deviation to be converted to the speed command, the rotational speed of the motor 102 and the torque of the motor 102 change as shown in the graph of FIG. 5. Note that, when an instantaneous voltage drop occurs, the position deviation to be converted to the speed command is limited, but the actual position deviation that is output from the subtraction unit 109 increases; therefore, as shown in FIG. 5, after the voltage of the power source 103 is recovered and the position control unit 110 cancels the limit on the position deviation, the position deviation discontinuously increases.

On the other hand, the graph of FIG. 6 shows the changes in the position deviation, the rotational speed of the motor 102 and the torque of the motor 102 when the motor 102 is being controlled by a conventional motor control device when an instantaneous voltage drop occurs.

Note that the graphs of FIG. 5 and FIG. 6 show the traces of the changes in the position deviation to be converted into the speed command, in the rotational speed of the motor 102 and in the torque of the motor 102; however, the actual changes in the position deviation to be converted into the speed command, in the rotational speed of the motor 102 and the torque of the motor 102 do not completely agree with those shown in the graphs of FIG. 5 and FIG. 6. Also, depending on the control parameters and operational environment of the motor control device 101, the way in which the position deviation to be converted to the speed command, the rotational speed of the motor 102 and the torque of the motor 102 change varies. This is the same to FIG. 7, FIG. 8, and FIG. 10 through FIG. 13 which will be described later.

(Major Effect of First Embodiment)

As described above, in this embodiment, once an instantaneous voltage drop is detected by the voltage fluctuation detection unit 110, the position control unit 110 limits the speed command to be output. Therefore, in this embodiment, the increase in the speed deviation to be output from the subtraction unit 111, which happens when an instantaneous voltage drop occurs, can be suppressed; thus, the increase in the value of the torque command which will be output from the speed control unit 112 can be suppressed. Therefore, in this embodiment, even when an instantaneous voltage drop occurs, the motor 102 can be properly controlled to have the robot perform desired operations, and also a windup phenomenon can be prevented from occurring to prevent the unstable behavior of the robot. Consequently, in this embodiment, even when an instantaneous voltage drop occurs, the position control unit 110 limits the speed command; therefore, after the instantaneous voltage drop, the increase in the speed deviation can be suppressed in a short period of time.

In this embodiment, when an instantaneous voltage drop is detected by the voltage fluctuation detection unit 115, the position command output unit 108 varies the position command so as to reduce the rotational speed of the motor 102. Therefore, in this embodiment, an abrupt increase in the value of the speed command can be suppressed when the voltage of the power source 103 is recovered and the position control unit 110 cancels the limit on the speed command. Consequently, in this embodiment, a sudden acceleration of the motor 102 can be prevented to prevent an abrupt motion of the robot.

Note that, if an instantaneous voltage drop occurs while the motor 102 is being controlled by a conventional motor control device, the position deviation to be converted into the speed command increases as shown in FIG. 6, and as a result, the values of the speed command and the speed deviation increase; consequently, the value of the torque command increases, which may increase the value of the torque command above the limit. Also, when the instantaneous voltage drop ends and the voltage of the power source 103 is recovered, the rotational speed of the motor 102 suddenly increases to cancel the increased position deviation, thus suddenly increasing the rotational speed of the motor 102, as shown in FIG. 6.

Modification Example 1 of Motor Control Method at the Time of Instantaneous Voltage Drop In the above-described embodiment, when an instantaneous voltage drop occurs, the position command output unit 108 varies the position command to reduce the rotational speed of the motor 102 and also the position control unit 101 limits the speed command to be output. Beside these changes, when an instantaneous voltage drop occurs, only the position command may be varied to reduce the rotational speed of the motor 102. In this case, the position deviation to be converted to the speed command, the rotation speed of the motor 102 and the torque of the motor 102 at the time of the instantaneous voltage drop change as in the graph shown in FIG. 7.

Figure 7:
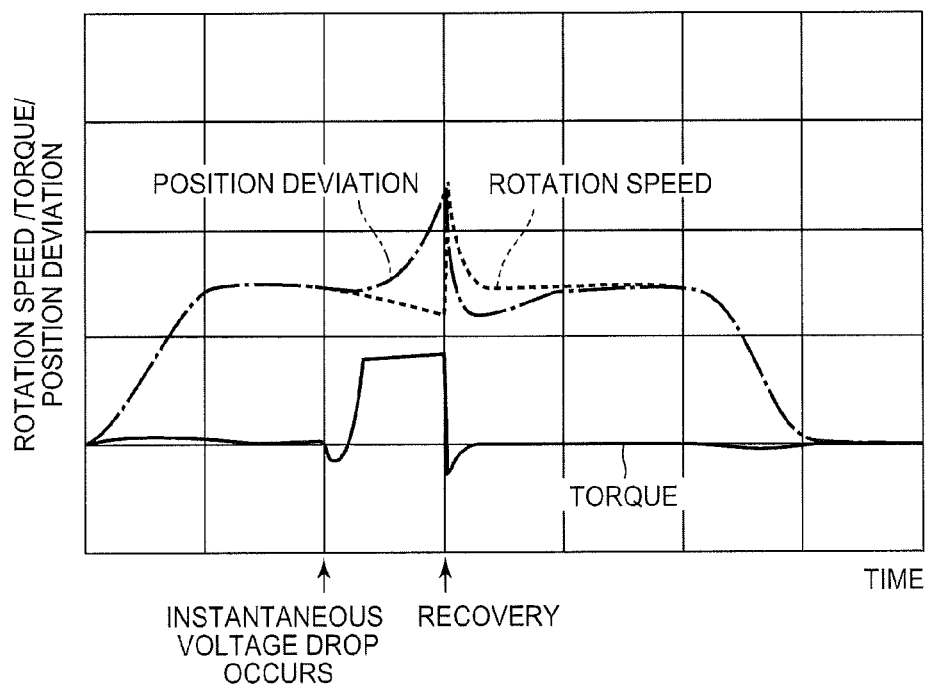
FIG. 7 An explanatory graph showing the changes in the position deviation, which will be converted to a speed command, and changes in the rotational speed and the torque of the motor when an instantaneous voltage drop occurs while the motor is being controlled by the motor control device of another embodiment of the present invention.
Figure 8:
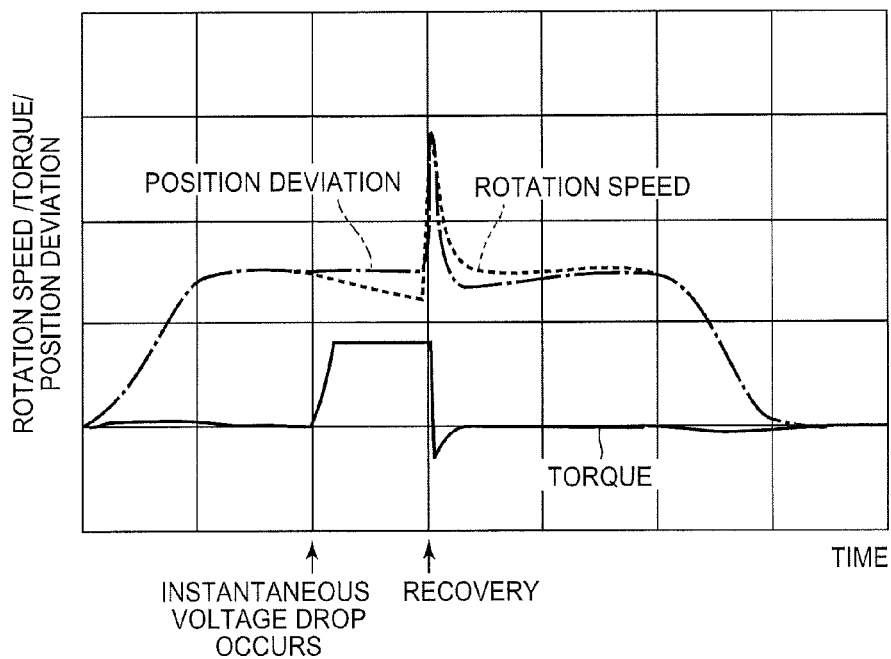
FIG. 8 An explanatory graph showing the changes in the position deviation, which will be converted to the speed command, and changes in the rotational speed and the torque of the motor when an instantaneous voltage drop occurs while the motor is being controlled by the motor control device of another embodiment of the present invention.

Even when only the position command is varied to reduce the rotation speed of the motor 102 at the detection of the instantaneous voltage drop, the increase in the position deviation which will be converted to the speed command can be suppressed as seen in the comparison between FIG. 6 and FIG. 7, and therefore, the increase in the value of the speed command and the value of the speed deviation can be suppressed, unlike the case in that the motor 102 is controlled by a conventional motor control device. Therefore, even in this case, the motor 102 can be properly controlled to have the robot perform a desired operation and a windup phenomenon is prevented from occurring to prevent the unstable behavior of the robot at the time of an instantaneous voltage drop; thus, the robot can be properly operated without stopping the motor 102 even when an instantaneous voltage drop occurs. Also, in this case, the increase in the actual position deviation which is output from the subtraction unit 109 can be suppressed at the time of an instantaneous voltage drop; therefore, an abrupt fluctuation of the speed command that takes place when the voltage of the power source 103 is recovered and the position command is returned to the original position, can be suppressed.

Modification Example 2 of Motor Control Method at the Time of Instantaneous Voltage Drop In the above-described embodiment, when an instantaneous voltage drop occurs, the position command output unit 108 varies the position command so as to reduce the rotational speed of the motor 102, and also the position control unit 110 limits the speed command to be output. Beside this, when an instantaneous voltage drop occurs, only the speed command which will be output from the position control unit 110 may be limited. In this case, the position deviation to be converted to the speed command, the rotational speed of the motor 102 and the torque of the motor 102 at the time of an instantaneous voltage drop change as in the graph shown in FIG. 8.

Even in this case, as described above, the increase in the speed deviation to be output from the subtraction unit 111 can be suppressed at the time of an instantaneous voltage drop, and thus the increase in the value of the torque command to be output from the speed control unit 112 can be suppressed. Therefore, even when an instantaneous voltage drop occurs, the motor 102 can be properly controlled to have the robot perform a desired operation, and a windup phenomenon can be prevented to prevent the unstable behavior of the robot. Also, once an instantaneous voltage drop occurs, the position control unit 110 limits the speed command to be output; therefore, after the instantaneous voltage drop, the increase in the speed deviation can be suppressed in a short period of time.

Modification Example 1 of Motor Control Method after Instantaneous Voltage Drop

In the above-described embodiment, when an instantaneous voltage drop ends and the voltage of the power source 103 is recovered above the reference value, the position control unit 110 cancels the limit on the speed command, and the position command output unit 108 returns the position command to the original state. Beside this, when the voltage of the power source 103 is recovered above the reference value, first the position command output unit 108 delays the position command (i.e., first the position command output unit 108 outputs the commanded position in which the target rotational position of the motor 102 is moved back by a predetermined amount) to reduce the position deviation to be output from the subtraction unit 109, then the position control unit 110 cancels the limit on the speed command and the position command output unit 108 returns the position command to the original state at the position after the position command output means has delayed the position command.

Figure 9:
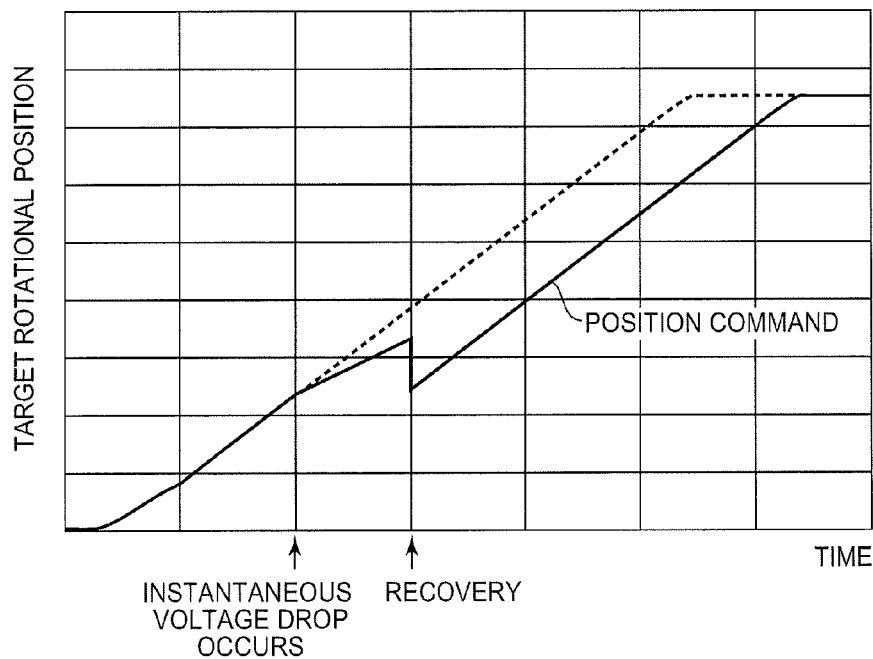
FIG. 9 A graph showing an example of a position command that is output from the position command output unit while the motor is being controlled by the motor control device of another embodiment of the present invention.
Figure 10:
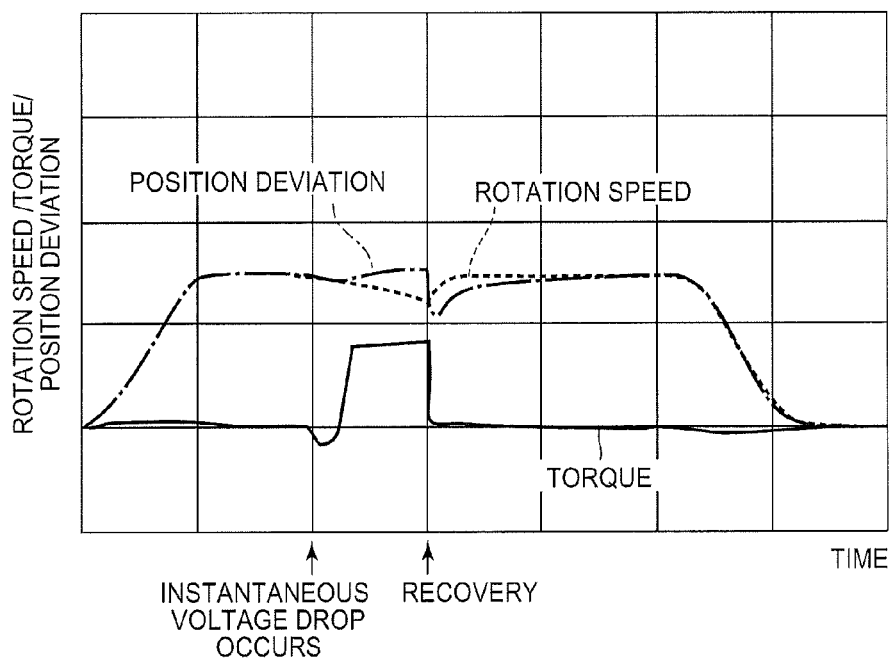
FIG. 10 An explanatory graph showing the changes in the position deviation, which will be converted to the speed command, and changes in the rotational speed and the torque of the motor when an instantaneous voltage drop occurs while the motor is being controlled by the motor control device of another embodiment of the present invention.
Figure 11:
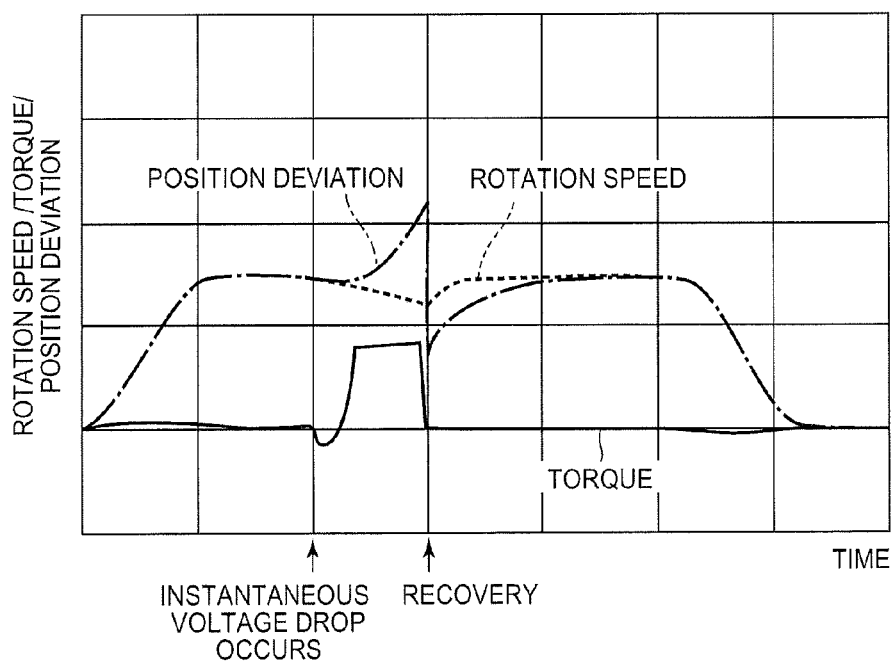
FIG. 11 An explanatory graph showing the changes in the position deviation, which will be converted to the speed command, and changes in the rotational speed and the torque of the motor when an instantaneous voltage drop occurs while the motor is being controlled by the motor control device of another embodiment of the present invention.
Figure 12:
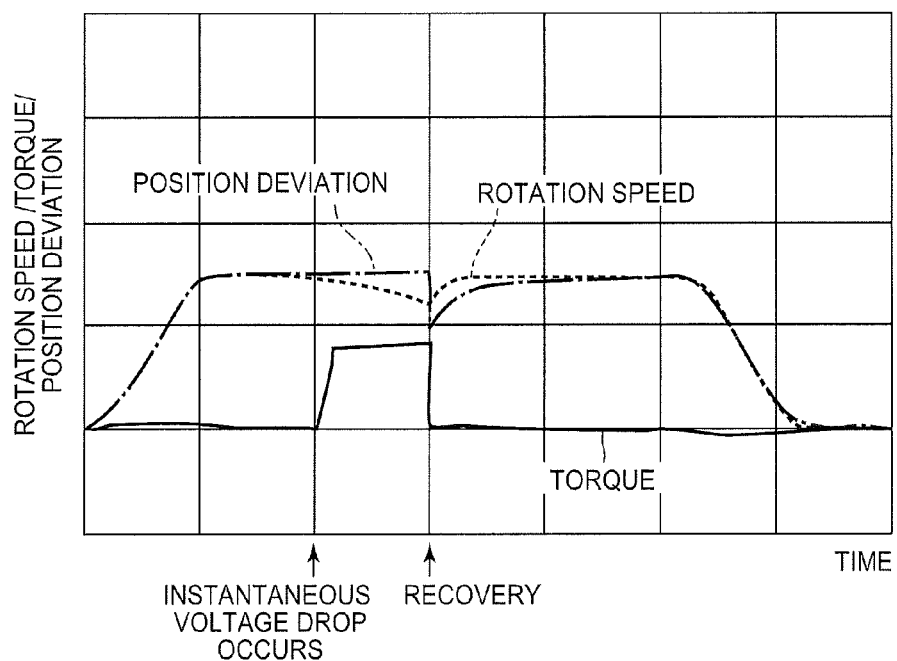
FIG. 12 An explanatory graph showing the changes in the position deviation, which will be converted to the speed command, and changes in the rotational speed and the torque of the motor when an instantaneous voltage drop occurs while the motor is being controlled by the motor control device of another embodiment of the present invention.

In other words, when the voltage of the power source 103 is recovered above the reference value, the position command is first delayed by the position command output unit 108, then the position command is returned to the original state at the position after the position command output means has delayed the position command, and the position control unit 110 may cancel the limit on the speed command, as shown by the solid line in FIG. 9. In this case, the position deviation to be converted to the speed command, the rotational speed of the motor 102 and the torque of the motor 102 change as in the graph shown in FIG. 10. Note that the dashed line in FIG. 9 indicates the change in the position command when no instantaneous voltage drop has occurred; the solid line indicating the change in the position command seen after the position command output unit 108 delays the position command and then returns the position command to the original state at the position after the position command output means has delayed the position command, is parallel to the dashed line indicating the change in the position command displayed when no instantaneous voltage drop has occurred.

In the case, it is possible that, when the voltage of the power source 103 has recovered above the reference value and then the limit on the speed command is cancelled and the position command is returned to the original state, a sudden increase in the value of the speed command is suppressed. Therefore, as understood in the comparison between FIG. 5 and FIG. 10, for example, it is possible that, when the voltage of the power source 103 has recovered above the reference value and then the limit on the speed command is cancelled and the position command is returned to the original state, a great fluctuation in the value of the rotational speed is suppressed. Therefore, in this case, a sudden acceleration of the motor 102 can be prevented when the voltage of the power 103 is recovered above the reference value and then the position command is returned to the original state or the limit on the speed command is cancelled; as a result, an abrupt motion of the robot can be prevented.

Note that, when the voltage of the power source 103 is recovered above the reference value, the position command output unit 108 may return the position command to the original state and delay the position command and then the position control unit 110 may cancel the limit on the speed command. Also, when it is detected that the voltage of the power source 103 has recovered above the reference value, first the position control unit 110 may cancel the limit on the speed command, and then the position command output unit 108 may delay the position command and then the position command output unit 108 may return the position command to the original state.

Further, in case that an instantaneous voltage drop occurs and only the position command to reduce the rotational speed of the motor 102 is varied, when the voltage of the power source 103 is recovered above the reference value, the position command output unit 108 may delay the position command so as to reduce the position deviation to be output from the subtraction unit 109, and then return the position command to the original state at the position after the position command output means has delayed the position command. In this case, the position deviation to be converted to the speed command, the rotational speed of the motor 102 and the torque of the motor 102 change as in the graph shown in FIG. 11.

Even in this case, it is possible to suppress a sudden increase in the value of the speed command when the voltage of the power source 103 is recovered above the reference value and the position command is returned to the original state. Therefore, as understood in the comparison between FIG. 7 and FIG. 11, it is possible that, when the voltage of the power source 103 is recovered exceeding the reference value and the position command is returned to the original state, a great fluctuation of the rotational speed of the motor 102 can be suppressed.

Also, in case that an instantaneous voltage drop occurs and only the speed command to be output from the position control unit 110 is limited, when the voltage of the power source 103 is recovered above the reference value, the position command output unit 108 delays the position command so as to minimize the position deviation to be output from the subtraction unit 103, and then the position control unit 110 may cancel the limit on the speed command. In this case, the position deviation to be converted to the speed command, the rotational speed of the motor 102 and the torque of the motor 102 change as in the graph shown in FIG. 12.

Even in this case, it is possible that, when the voltage of the power source 103 is recovered above the reference value and the position command is returned to the original state, a sudden increase in the value of the speed command is suppressed. Therefore, as understood in the comparison between FIG. 8 and FIG. 12, for example, a fluctuation of the rotational speed of the motor 102 can be greatly suppressed when the voltage of the power source 103 is recovered and then the position command is returned to the original state.

Figure 13:
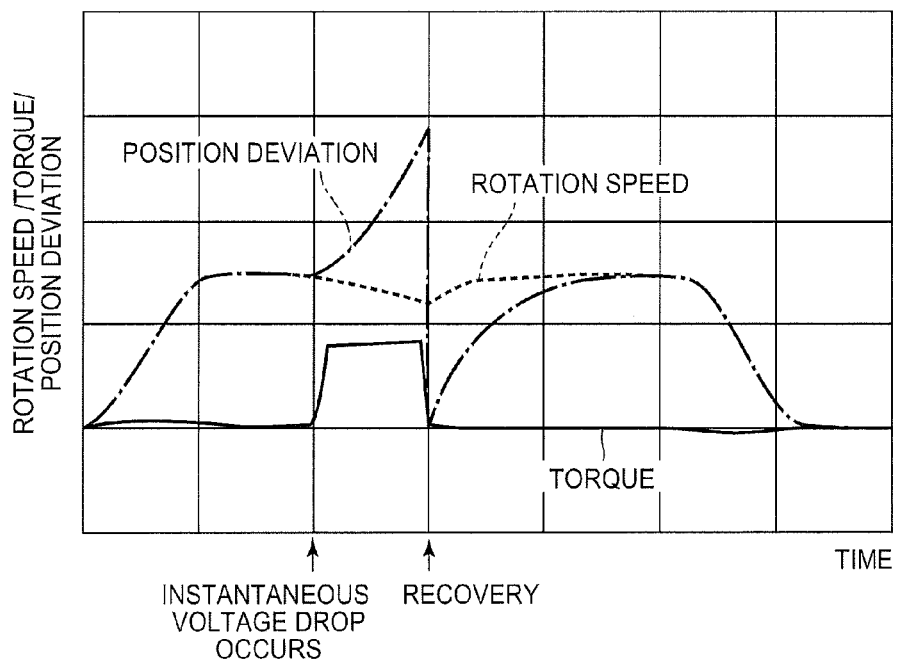
FIG. 13 An explanatory graph showing the changes in the position deviation, which will be converted to the speed command, and changes in the rotational speed and the torque of the motor when an instantaneous voltage drop occurs while the motor is being controlled by the motor control device of another embodiment of the present invention.

Note that, in case that neither the position command is varied to reduce the rotational speed of the motor 102 nor the speed command to be output from the position control unit 110 is limited, when the voltage of the power source 103 is recovered above the reference value and the position command output unit 108 delays the position command to minimize the position deviation to be output from the subtraction unit 109, the position deviation to be converted to the speed command, the rotational speed of the motor 102 and the torque of the motor 102 change as in the graph shown in FIG. 13.

Modification Example 2 of Motor Control Method after Instantaneous Voltage Drop

In the above-described embodiment, upon the end of the instantaneous voltage drop and the recovery of the voltage of the power source 103, the position control unit 110 cancels the limit on the speed command, and the position command output returns the position command to the original state. Beside this, even after the voltage of the power source 103 has recovered, the speed command may continually be limited and the position command may continually be varied to reduce the rotational speed of the motor 102; when the position deviation output from the subtraction unit 109 is minimized to some extent, the position control unit 110 may cancel the limit on the speed command and the position command output unit 108 may return the position command to the original state. In other words, after a predetermined period of time has passed after the voltage of the power source 103 recovered, the position control unit 110 may cancel the limit on the speed command and the position command output unit 108 may return the position command to the original state.

For example, even after the voltage of the power source 103 is recovered, the speed command may be continually limited and the position command may also be continually varied to reduce the rotational speed of the motor 102 until the position command output from the position command output unit 108 enters the speed reduction region in which the speed of the motor 102 is reduced or until the position command output from the position command output unit 108 is completed, and for each varied position command, the position control unit 110 may cancel the limit on the speed command and the position command output unit 108 may return the position command to the original state. When the position command enters the speed reduction region or the position command output from the position command output unit 108 is completed, the position deviation output from the subtraction unit 109 (that is, the difference between the position command and the actual rotational position that is output from the position detection unit 106) becomes small, getting closer to the position deviation that is converted to the speed command at the position control unit 110.

In this case, therefore, a sudden hike of the value of the speed command can be suppressed when the limit on the speed command is cancelled and the position command is returned to the original state after the voltage of the power source 103 is recovered. Thus, in this case, it is possible to prevent a sudden acceleration of the motor 102 that happens when the position command is returned to the original state or the limit on the speed command is cancelled after the voltage of the power source 103 has recovered; as a result, an abrupt motion of the robot can be prevented.

Modification Example 3 of Motor Control Method after Instantaneous Voltage Drop

In the above-described embodiment, when the instantaneous voltage drop ends and the voltage of the power source 103 is recovered, the position control unit 110 cancels the limit on the speed command and the position command output unit 108 returns the position command to the original state. Beside this, when the instantaneous voltage drop ends and the voltage of the power source 103 is recovered, the position control unit 110 may cancel the limit on the speed command first, and then the position command output unit 108 may return the position command to the original state.

Other Embodiments

The above-described embodiment is an example of preferred embodiments of the present invention; however, it is not limited to this, but can be varyingly modified within the scope of the present invention.

In the above-described embodiment, when an instantaneous voltage drop is detected at the voltage fluctuation detection unit 115, the position command output unit 108 varies the position command to reduce the rotational speed of the motor 102, and the position control unit 110 limits the speed command to be output. Beside this, when the voltage fluctuation detection unit 115 detects that the voltage of the power source 103 has dropped by a predetermined amount (i.e., the voltage fluctuation detection unit 115 detects that the voltage of the power source 103 has fallen below the predetermined reference value), the position command output unit 108 may vary the position command to reduce the rotational speed of the motor 102 and the position control unit 110 may limit the speed command to be output.

Conventionally, when adjusting the operational parameters of the motor 102, such as the speed and the speed increase or reduction, the motor 102 is operated by a voltage lower than the actual voltage of the power source 103. For example, when the actual voltage of the power source 103 is 200V, a voltage lower than 200V is applied to the driver 114 during the adjustment of the operation parameters of the motor 102. This allows the driver to safely start or stop the motor 102 even when the voltage of the power source 103 is steadily low. In other words, conventionally the operation parameter of the motor 102 is given a value that provides a margin with respect to the actual voltage of the power source 103.

On the other hand, in case of the configuration that, when the voltage fluctuation detection unit 115 detects that the voltage of the power source 103 has dropped by a predetermined level, the position command output unit 108 varies the position command to reduce the rotational speed of the motor 102 and the position control unit 110 limits the speed command to be output, the motor 102 can properly be controlled by following the fluctuation of the voltage of the power source 103; therefore, the motor 102 can safely be operated and stopped even with the operation parameter which is adjusted by the actual voltage. In this case, therefore, the motor 102 can be operated at a higher speed and by higher acceleration than the conventional case, thus capable of operating the robot at a high speed. Consequently, the Takt time in the process in which the robot is used can be shortened.

Second Embodiment: Control System and Position Estimation Method Used in the Control System The best form of the second embodiment of the present invention is described hereinafter referring to the drawings.
(Robot System)

Figure 14:
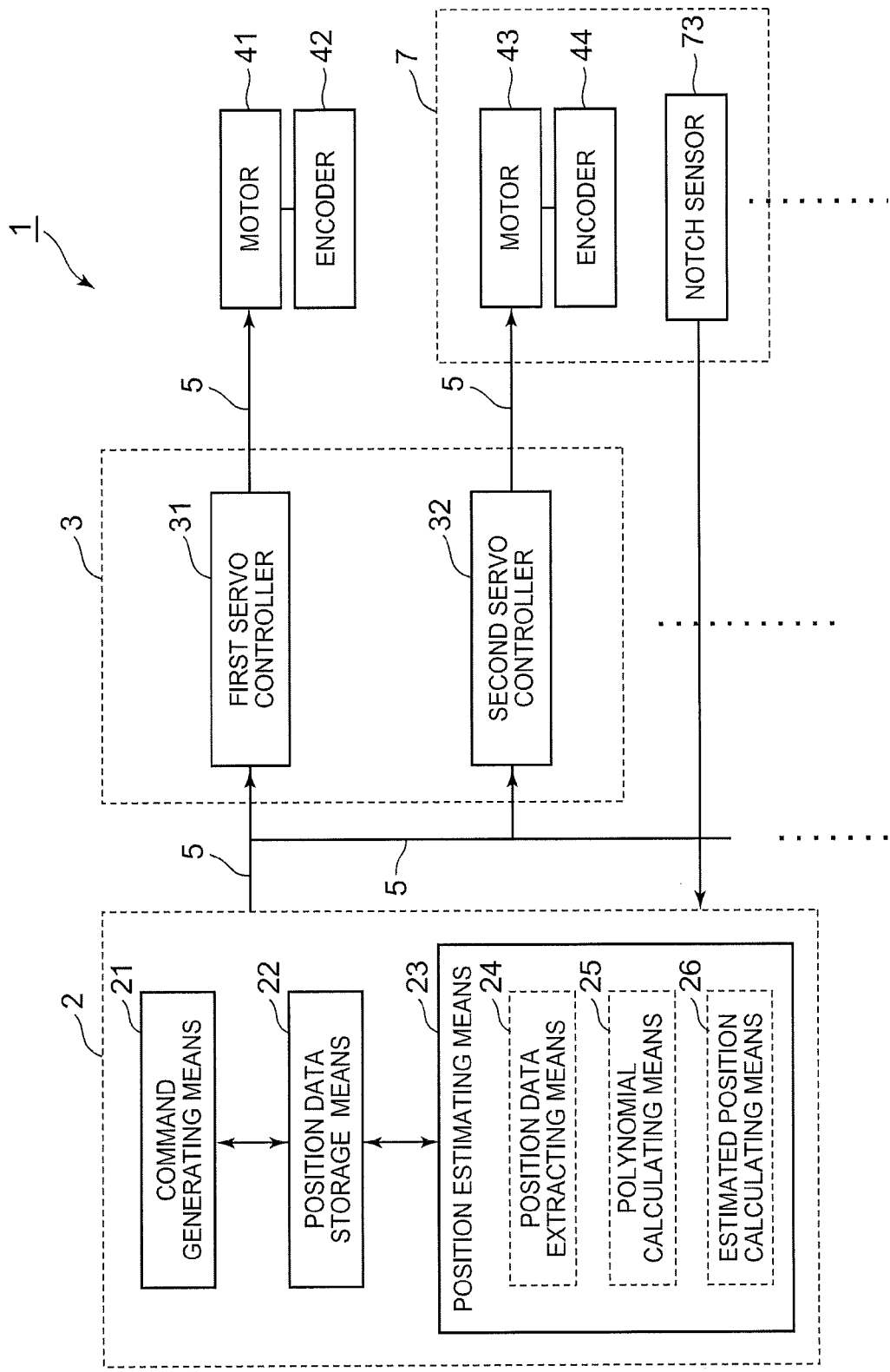
FIG. 14 A block diagram showing a system configuration of a robot control system of a second embodiment of the present invention.
Figure 16:
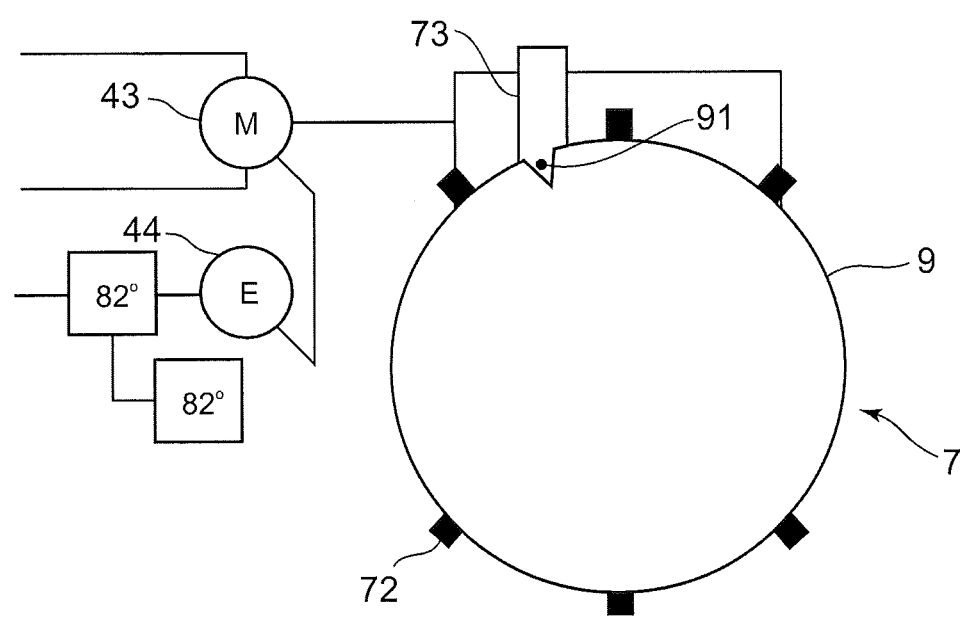
FIG. 16 A plan view of a wafer held by an aligner and chucks of the second embodiment of the present invention.

FIG. 14 is a block diagram showing a system configuration of a robot control system of the embodiment of the present invention. FIG. 15 is a diagram showing a robot to which the robot control system of the embodiment of the present invention can be applied. FIG. 16 is a plan view of a wafer which is held by an aligner and a chuck of the embodiment of the present invention.

Before describing a robot control system of an embodiment of the control system of the present invention, a robot is first described.
(Robot)

A robot 6 shown in FIG. 15 is a transport robot (hereinafter called "robot") which moves works such as semiconductor wafers (hereinafter called "wafer") loaded in a cassette to the inside of a film deposition apparatus. Also, in this embodiment, the wafer 9 is a body to be controlled.

The robot 6, as shown in FIG. 15, is equipped with a base-side arm 64, a hand-side arm 65 and a hand 66 rotatably joined by joint portions 61, 62 and 63, and transmits the rotation force of a first motor 41 arranged to a base, which is not shown in the figure, to the base-side arm 64 and the hand-side arm 65 to perform desired operations. The robot 6 having such a configuration moves the hand 66, on which a wafer 9 is loaded, in a straight line, constantly directing the hand in a given direction. Note that the configuration and the operation of the robot 6 are publicly known; therefore, the detailed description of those is omitted here. Also, the robot 6 is equipped with the first motor 41 for driving the base-side arm 64, the hand side arm 65 and the hand 66, a first encoder 42 as a sensor for detecting the position data of the arms based on the rotational angle of the first motor 41, at a predetermined cycle. Note that the first encoder is fixed to the rotary shaft of the first motor 41.

(Aligner)

The wafer 9 is randomly arranged when transferred to and stored in the cassette 8; therefore, when the robot 6 takes the wafer 9 out of the cassette 8 for various fabrication processes to be performed on the wafer 9, the fabrications need to be carried out as a notch 91 is positioned in a correct position. Therefore, a method is adopted in which the wafer 9 taken out from the cassette 8 is transported to an aligner 7, the position of the notch 91 is aligned with the correct position by the aligner 7, and then the wafer 9 is set on a processing stage.

For the time that the robot 6 takes the wafer 9 out of the cassette 8 and transports it to a film deposition apparatus, a notch 91 is formed at one location in the edge of the wafer 9 to detect the positioning. When transferred to and stored in the cassette 8, the wafer 9 is randomly arranged; therefore, various fabrications need to be performed on the wafer 9 while the notch 91 is positioned in the correct position. A device for positioning the notch 91, i.e., a device for aligning the angle of the wafer 9 is generally called an aligner 7; the wafer 9 is held at a holding shaft first, the position of the notch 91, with a half or a full turn, is detected, and the holding shaft is rotated at a predetermined angle based on the detection result to align the wafer 9 in the correct position. In this embodiment, as shown in FIG. 15 and FIG. 16, the aligner 7 is a device for detecting the notch 91 in the wafer 9 and aligning the orientation of the wafer 9. In this embodiment, the aligner 7 which turns and adjusts the wafer 9 to be oriented in a predetermined direction is placed within the range in which the robot 6 can transport the wafer 9.

The aligner 7 has an orientation function which turns the loaded wafer 9 and detects the notch 91 provided in the edge to align the orientation and the holding angle (of the notch 9) of all the loaded wafers 9. In this embodiment, the aligner 7 has a turntable 71 that loads the wafer 9 thereon and turns together, a second motor 43 that drives the turntable 71 having the wafer 9 loaded thereon, a second encoder 44 as a sensor that detects the position data based on the rotational angle data of the second motor 43, and a notch sensor 73 that detects the notch 91. In this embodiment, as shown in FIG. 15 and FIG. 16, the turntable 71 has a plurality of chucks 72 (at six locations in FIG. 15 and FIG. 16), which clamp the circumference of the wafer 9 and are arranged on the turntable 71 such that they are concentric with the turntable 71 without eccentricity.

(Configuration of Notch Sensor)

As shown in FIG. 15 and FIG. 16, a notch 91 is cut in an V-shape or U-shape on the outer circumference of the wafer 9 as a mark of a positioning part that indicates the correct positioning of the wafer 9 in the circumferential direction. In this embodiment, the notch sensor 73 for detecting the notch 91 formed in the wafer 9 is arranged at the position on the left (upper left in FIG. 16) of the turntable 71 in FIG. 15. The notch sensor 73 is a photo sensor composed of a light-emitting device and a light-receiving device; more specifically, it is equipped with a LED that irradiates a detection light, a photo diode that detects the reflection light of the irradiation light, and a light path pipe that guides the beam entering the LED and the photo diode to the wafer 9. Therefore, the detection light of the LED is irradiated onto the edge of the wafer 9 held by the hand 66, the reflection light enters the photodiode when reflected at the edge, and there is no incidence on the photodiode when the beam passes through the notch 91 and is not reflected.

(Configuration of Robot Control System)

A robot control system 1 of the present invention controls the movements of the robot that takes out (semiconductor) wafers from a cassette and transports them to a film deposition apparatus in a semiconductor manufacturing process. FIG. 14 is a block diagram showing a system configuration of the robot control system of this embodiment of the present invention.

The robot control system 1 controls the drive of (the arm of) the robot 6 transporting the wafer 9 and the drive of the aligner 7 that aligns the orientation of the wafer 9. In this embodiment, as shown in FIG. 14, the robot control system 1 mainly has a position control unit 2, a servo control unit 3, a drive unit 4 (the first motor 41, the second encoder 42, the second motor 43 and the second encoder 44) for driving body to be controlled and a communication circuit 5.

The robot control system 1 orders an operation command (a position command) to the servo controllers 31 and 32 which respectively servo-control the first motor 41 for rotating the joint of the robot and the second motor 43 for rotating the aligner 7. Also, the joint of the robot and the aligner 7 have the first and second encoders 42 and 44 for measuring the rotational angles of the first and second motors 41 and 43; the position control unit 2 performs a servo-control via the servo control unit 3 (the servo-controllers 31 and 32) while sampling the deviation between the target number and the actual measurement by referring to the position feedback data (such as the rotational angle measurement) sent from the first and second encoders 42 and 44.

(Configuration of Position Control Unit)

The position control unit 2 generates an operation command to the first and second servo controllers 31 and 32, and has a command generating means that sends an operation command to each of the servo controller 31, 32, and a position data storage means that receives the feedback position data sent from each servo controller 31, 32 at a predetermined cycle and stores the received position data (feedback data) together with the obtaining time. Further, the position control unit 2 is equipped with a position estimating means 23 that estimates the position of the drive unit 4 at an arbitrary time based on the position data (feedback data) at the predetermined cycle, received and stored by the position data storage means 22.

(Configuration of Position Estimating Means)

In this embodiment, the position estimating means 23, as shown in FIG. 14, has a position data extracting means 24, a polynomial calculating means 25 and an estimated-position calculating means 26.

The position data extracting means 24 extracts the position data at the time near the time tk at which the position of the drive unit 4 is estimated. The number of the position data to be extracted depends on the order n of the polynomial that is interpolated, and the number of the position data needed is (n+1) for the order n of the polynomial at least. Note that, in this embodiment, since the position of the notch 91 of the wafer 9 is estimated, the drive unit 4 is the second motor 43 that rotates the turntable 71 of the aligner 7 and the second encoder 44.

The polynomial calculating means 25 expresses the position f(t) of the notch 91 of the wafer 9 (the second motor 43 for the aligner 7) at the time t by an n-order polynomial as shown in Formula 3. The order n of the polynomial is the number of the position data extracted by the position data extracting means 24 minus 1; for example, when four position data are extracted, n=3.

$$f(t) = \sum_{i=0}^{n} a_i t^i \qquad \text{[Formula 3]}$$

The polynomial calculating means 25 obtains the coefficient $a_i$ of the polynomial expressed by Formula 3 using Formula 4 based on the (n+1) position data $y_i$ extracted by the position data extraction means 24 and the obtaining time $t_i$ corresponding to each of the position data $y_i$, to calculate the polynomial that expresses the position f(t) of the notch 91 (the second motor 43).

$$\theta^T = [W^{\wedge}TW]^{-1} W^T X \qquad \text{[Formula 4]}$$

$$X = (y_0 y_1 \ldots y_n), \theta = (a_o a_1 \ldots a_n), W = \begin{pmatrix} t_o^n t_o^{n-1} & \ldots & t_0^0 \\ t_n^n t_n^{n-1} & \ldots & t_n^0 \end{pmatrix}$$

The estimated-position calculation means 26 calculates the position f(tk) of the notch 91 (the second motor 43) at the time tk at which the position estimation is performed, based on the polynomial calculated by the polynomial calculating means 25. An arbitrary time before the position at which the estimate is performed can be set as the time tk at which the position of the notch 91 (the second motor 43) is estimated.

(Configuration of Servo Control Unit)

The servo control unit 3 drive-controls the drive unit 4 based on the operation command from the command generating means 21. In this embodiment, the servo control unit 3 has a first servo controller 31 for drive-controlling the first motor 41 that drives the arm and the like of the robot 6 and a second servo controller 32 that drives the turntable 71 provided to the aligner 7.

(Motor and Encoder)

The drive unit 4 drives the predetermined operation based on the control signal from the servo control unit 3. In this embodiment, as shown in FIG. 15, the drive unit 4 is established by the first motor 41 and the first encoder 42 or the second motor 43 and the second encoder 44. The first motor 41 is connected to the joint 61 of the base-side arm 64 of the robot 6. Also, the first encoder 42 is arranged to the rotational shaft of the first motor 41 to detect the position data based on the rotational angle data of the first motor 41. Also, the second motor 43 is connected to the turntable 71 provided to the aligner 7. The second encoder 44 is arranged to the rotary shaft of the second motor 43 to detect the position data based on the rotational angle data of the second motor 43.

(Communication Circuit)

Code 5 indicates a communication circuit. In this embodiment, as shown in FIG. 14, each command to the servo control unit 3 and the drive unit 4 is sent from the position control unit 2 via a serial transmission. In other words, in this embodiment, the position control unit 2 and the first servo controller 31 configuring the servo control unit 3 are electrically connected to each other by wire or wirelessly. Then, the first servo controller 31 is electrically connected to the second servo controller 32 by wire or wirelessly. By this, the command from the position control unit 2 to the second servo controller 32 is sent via the first servo controller 31. Through such a serial transmission, a single system is sufficient for the output/input of the signal in the robot control system 1, thus preventing a complicated wiring. In this embodiment, the communication cycle of the communication circuit 5 is 4 msec.

Also, the first and second encoders 42 and 44 are electrically connected to the first and second motors 41 and 43 respectively by wire or wirelessly. The position data (such as the rotational angle measurement) measured by the first and second encoders 42 and 44 is sent to the position control unit 2 via the servo control unit 3 (the servo controllers 31 and 32) connected thereto by the communication circuit 5.

(Operation of Robot)

Next described is the operation in which the robot 6 takes out the wafer 9 from the cassette and performs a so-called orientation operation to align the orientation and the holding angle of the wafer 9 by the aligner 7, and place on a processing device (no illustration) which is the second position after the orientation operation.

For transferring the wafer 9 from the cassette 8 to the processing device (not illustration), the robot 6 inserts its hand 66 in the cassette 8 to pull out the wafer 9. Next, the robot 6 rotates the base-side arm 64 and the hand-side arm 65 to place the center of the wafer 9 on the turntable 71 of the aligner 7. The aligner 7 is in the original position (the reference position) at the time when the wafer 9 is placed. More specifically described, the original position (the reference position) is at 0° when the second encoder 44 for detecting the position of the second motor 43 is in this position (at this angle). As shown in FIG. 16, the turntable 71 holds the outer circumference of the wafer 9 by using the chucks 72, and upon completion of holding, it turns as it is. Then, the notch sensor 73 of the aligner 7 detects the notch 91 formed in the edge of the wafer 9 by the notch sensor 73 (photo sensor). The rotational position at which the notch 91 in the wafer 9 has passed the notch sensor 73 is stored in the position data storage means 22 to be used for positioning the wafer 9. Based on the detection result, the wafer 9 is supported in a predetermined orientation with respect to the aligner 7. After that, the chucks 72 alienate, and the hand 66 holds up the wafer 9 from the aligner 7 to place it in the process device. Here, because the wafer 9 is supported in the predetermined orientation with respect to the aligner 7 in advance, the wafer 9 is also placed in a predetermined orientation with respect to the processing device. While the robot 6 is working, the aligner 7 is returned to the original position (the reference position) and stands by. Note that these operations are repeated for each wafer 9.

(Position Estimation Method)

Figure 17:
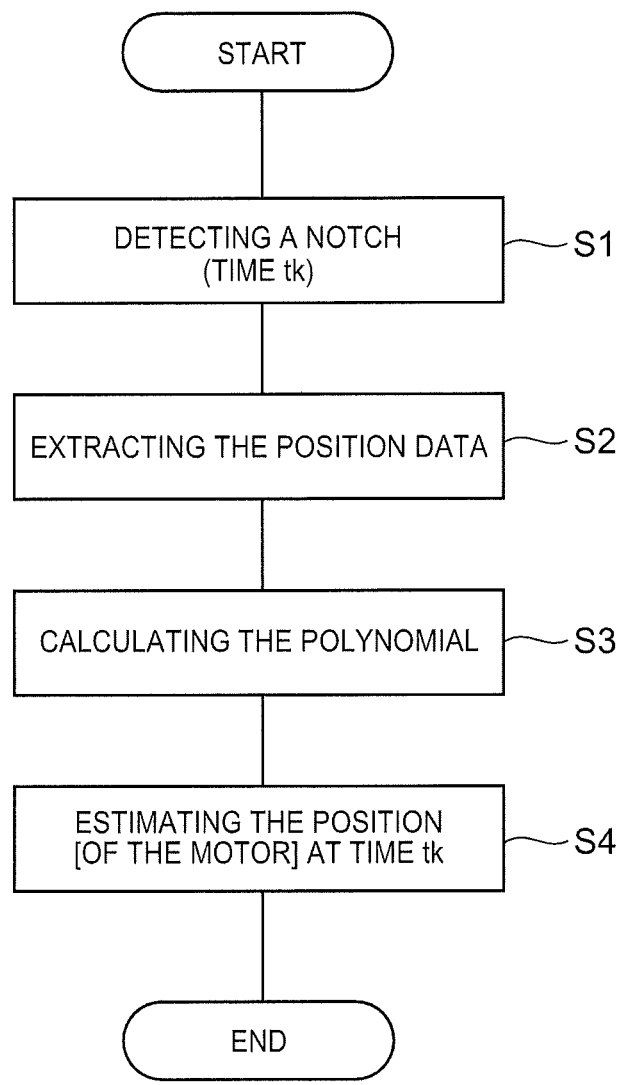
FIG. 17 A flowchart of an aligner drive control of the second embodiment of the present invention.
Figure 18:
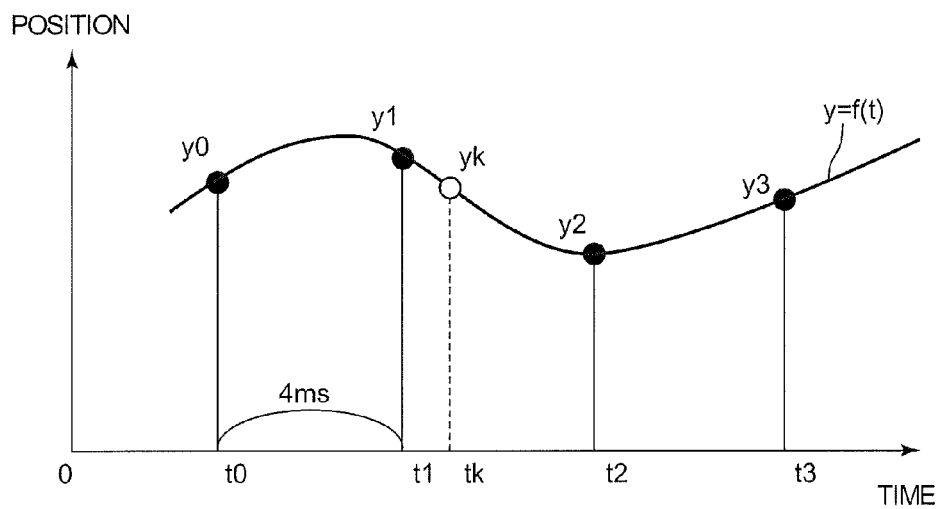
FIG. 18 An explanatory diagram of an estimation operation by the polynomial interpolation, obtained by the position estimating means of the second embodiment of the present invention.

Next, a position estimation method that uses the robot control system of the embodiment of the present invention is described by referring to the drive control of the aligner 7 shown in FIG. 17 and FIG. 18. FIG. 17 is a flowchart of the aligner drive control of the embodiment of the present invention. FIG. 18 is a diagram to explain the estimation operation by the polynomial interpolation obtained by the position estimating means of the embodiment of the present invention. In FIG. 18, the vertical axis indicates the position (angle) of the second encoder 44, 0 indicates the original position (the reference position) and the horizontal axis indicates time.

In the flowchart shown in FIG. 17, Start is the condition where the hand 66 of the robot 6 places the wafer 9 on the turntable 71 and the chucks 92 of the aligner 7 hold the outer circumference of the wafer 9. At that time, the second motor 43 and the second encoder 44 are halted in the original position (the reference position).

The second motor 43 is rotated by the control signal from the second servo controller 32, based on the operation command of the command generating means 21 of the position control unit 2. Through these, the wafer 9 placed on the turntable 7 is rotated. When the notch sensor 73 arranged to the aligner 7 detects the notch 91 in the wafer 9 (see FIG. 16), the detection time tk (see FIG. 18) is sent to the position control unit 2 and stored in the position data storage means 22 (51). At that time, as shown in FIG. 18, the rotational position of the second motor 43 is detected by the second encoder 44 and sampled at the cycle of 4 ms. Therefore, the position at the time tk at which the notch sensor 73 has detected does not coincide with the sampling cycle; therefore, the accurate position has not been detected.

The aligner 7 rotates the wafer 9 by about a single turn to sample the position data at the cycle of 4 ms. For example, as shown as (time, rotational position)=(t0, y0), (t1, y1), (t2, y2), (t2, y2), (t3, (y3), . . . in FIG. 18, the rotational position is sent as the output signal of the second encoder 44 to the position control unit 2 at every 4 ms, and the position data storage means 22 stores the time and the position data. After a single turn, the second motor 43 is stopped.

As the position estimating means 23 receives the detection signal (time tk) of the notch 91 via the position control unit 2, the position data extraction means 24 extracts four position data from the position data storage means 22 as the position data at two cycles before and after the time tk (S2). In other words, as shown in FIG. 18, (time, rotational position)=(t0, y0), (t1, y1), (t2, y2), (t2, y2), (t3, (y3) is extracted as the position data at two cycles before and after the time tk.

The polynomial calculating means 25 expresses the position f(t) of the wafer 9 at time t by the n-order polynomial shown in the above-described Formula 3. In this embodiment, the position of the second motor 43 is interpolated by a third order polynomial to respond to the acceleration or deceleration of the second motor 43. In this case, since the order n of the polynomial is 3, the number of the position data extracted by the position data extraction means 24 is (the order n+1=4).

The position data extraction means 24 extracts four position data so that the operation load to the polynomial calculating means 25 is lessened and can respond precisely to the speed fluctuation of the second motor 43. Further, the position data to be extracted are the position data at two cycles before and after the time tk. Note that the position data to be extracted can be any as long as it is taken at the time near the time tk at which the position estimation is performed.

The polynomial calculation method 25 obtains the coefficient $a_i$ of the polynomial shown in Formula 3 by the above-described Formula 4 based on the four position data $y_i$ extracted by the position data extraction means 24 and the obtaining time $t_i$ that corresponds to each of the position data $y_i$, to calculate the third-order polynomial that expresses the rotational position f(t) of the second motor 43 (S3). In FIG. 18, the line passing on the four positions (y0, y1, y2, y3) indicates the third-order polynomial.

The estimated-position calculating means 26 calculates the position f(tk) of the second motor 43 at the time tk at which the notch sensor 73 has detected the notch 91, based on the third-order polynomial calculated by the polynomial calculating means 25 (S4). In other words, the calculated position f(tk) is estimated as the position of the notch 91 in the wafer 9 placed on the turntable 71.

(Major Effects of Second Embodiment)

In this embodiment, the robot control system 1 interpolates the relationship between the rotational position and the time by the third-order polynomial in order to respond to the acceleration or deceleration of the second motor 43 that drives the aligner 7, and the position of the wafer 9 (the notch 91) at the time tk, at which the notch sensor 73 has detected, is estimated; therefore, the positioning of the wafer 9 can precisely be done. Also, since the position data in the two cycles each before and after the time tk are extracted to obtain the third-order polynomial and the position is estimated by using the position data; therefore, can respond precisely to the speed blur (the speed fluctuation) of the second motor 43.

Further, the position estimating means 23 can estimate the position of the notch 91 in the wafer 9 with precision even at the time of acceleration/deceleration or the load fluctuation of the second motor 43, and thus a high speed control of the turntable 71 on which the wafer 9 is loaded can be accomplished. In other words, the robot control system 1 can improve the positioning precision and the speed while keeping the cost low even in the robot that requires both the positioning precision and a high speed [control].

In the second embodiment, the robot control system 1 obtains the position data at the communication cycle of 4 msec of the communication circuit 5; therefore, the faster the second motor 43 rotates, the worse the precision of the position gets. If there is an input from the notch sensor 73 at an arbitrary position in this way, the position is taken as the same as the position obtained immediately before this; therefore, to accurately determine the sensor input position the sampling cycle of the second encoder 44 needs to be shorter than the conventional one and the position needs to be estimated from the input time by the notch sensor 73.

In the second embodiment, then, the position of the second motor 43 (the wafer 9) is considered in a polynomial of time, in which the coefficient of the polynomial can be derived from the position data obtained at the cycle of 4 msec and the [data obtaining] time, thus making it possible to estimate the position at an arbitrary time. Through the estimation operation by the polynomial interpolation, the position resolution can be improved and a highly precise positioning is made possible even if the second motor 43 moves (rotates) at a high speed.

The robot 6 of the second embodiment 2 is programmed, after placing the wafer 9 on the turntable 71 of the aligner 7 with its hand, not to stand-by but to perform other tasks, and the aligner 7 makes an attempt to position the wafer 9 while the robot 6 is performing other tasks. Therefore, the positioning precision of the aligner 7 is an important factor from the viewpoint of improving a throughput. More specifically described, the aligner 7 is required to have a positioning precision of 0.02 degrees in only 3 seconds of positioning. To complete the positioning of the wafer 9 within the required positioning time (3 seconds), the aligner 7 needs to turn the wafer 9 at 100 rpm. However, in the less expensive system configuration using the communication circuit 5 with the communication cycle of 4 msec, the maximum error exceeds 0.02 degrees. In order to keep the maximum error within 0.02 degrees when the aligner 7 turns the semiconductor wafer 9 at 100 rpm, the sensor input needs to be monitored at the 500 μs resolution for estimation control.

Figure 19:
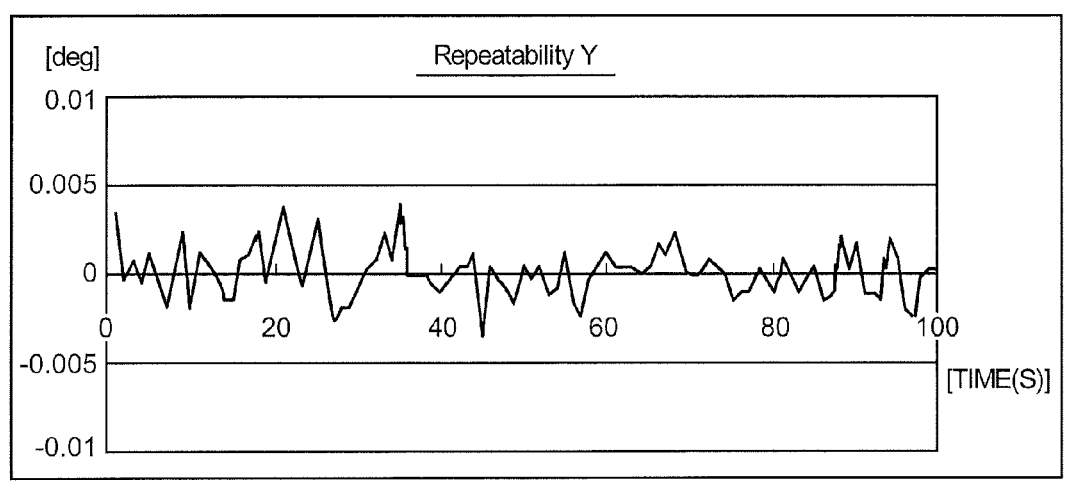
FIG. 19 A diagram showing a precision test result of the aligner.

The effects of the second embodiment are described hereinafter based on the experimental data. The aligner 7 uses the communication circuit 5 having the communication cycle of 4 msec. In the robot control system 1, the second motor 43 (the wafer 9) is rotated at 100 rpm to satisfy the positioning time within 3 seconds, and an image processing camera is installed to the aligner 7 and the test was repeated. FIG. 19 shows the precision test result. As shown in FIG. 19, the aligner 7 using the robot control system 1 can keep the error to within by ±3σ=0.0082 degrees while the required precision is 0.02 degree. Thus, according to the robot control system 1, even in the configuration using a cheap communication circuit 5 with the communication cycle of 4 msec, the aligner 7 can perform a high-speed, high precision positioning through the position estimation control that uses the polynomial interpolation, contributing to shortening the throughput.

Also, the robot control system 1 can be configured by using a general, inexpensive communication means or CPU, and thus a precise position estimation can be performed by an inexpensive control system. A general demand for the robot control system is a low price and a high speed and high precision which are the most important performance factor in particular. On the other hand, if a cheap hardware configuration is used to lower the system price, the performance (high speed and high precision) will be limited. For example, in the robot control system 1 used in a liquid crystal or semiconductor manufacturing process, a communication circuit 5 whose speed is not very fast is used. Therefore, the robot control system 1 using the communication circuit 5 will have a problem in the resolution of the position due to the limit of the communication cycle.

By interpolating the relationship between the position of the notch 91 and the time with the third-order polynomial through the position estimating means 23 described in the second embodiment, the performance limit of inexpensive hardware used in the system control the performance (a high speed and high precision) is increased by performing the position estimation with software.

Other Embodiments

In the robot control system 1 shown in FIG. 14, the description was made using the first motor 41 and the second motor 43 for convenience in explanation, but is not limited to this. Also, in this embodiment, the position of the second motor 43 for the aligner 7 is estimated to estimate the position of the notch 91 in the wafer 9 placed on the turntable 71; however, it is not limited to this. The rotational position of the motor at which the arm stops when it places the wafer 9 on the turntable 71 or at which the arm of the robot 6 stops when it places the wafer 9 in or takes out the wafer 9 from the cassette, and the rotational position of the first motor 41 when the motor 41 drives and stops the arm at the predetermined position, may be estimated.

Using the position estimating means 23 described in the second embodiment, an arbitrary time prior to the position at which the position estimation is performed is set as the time tk at which the position estimation is performed; however, it is not limited to this. For example, the position estimating means 23 may be equipped with an extrapolation operation means that performs an extrapolation operation based on the position data (feedback data), by which the current or future position of the motor is estimated. By this, can respond precisely to the load fluctuation or the speed fluctuation of the motor, and the current or future position of the body to be controlled can also be estimated by the extrapolation operation.

The first motor and the first encoder or the second motor and the second encoder that together configure the drive unit are not required to be physically a single unit. In this embodiment, the encoder is adopted for a "sensor" that detects the position data based on the rotational angle of the motor; however, beside this, any device or equipment may be used as long as the position data can be detected.

In the second embodiment, the wafer 9 has a V-shaped or U-shaped notch in the outer circumference thereof as a mark that indicates a correct positioning of the wafer 9 in the circumferential direction. An orientation flat that cuts the edge [of the wafer] in an arc shape may also be used for position detection.

Possible Industrial Use

According to the control system of the present invention and the position estimation method used in this control system, the operation load to the estimator that estimates the position at an arbitrary time from the sampled position data can be minimized, and the device can precisely respond to the load fluctuation or the speed fluctuation of the motor

What is claimed is:

1. A motor control device for controlling a motor that operates a robot, comprising:
    a position command output means that outputs a position command for controlling said motor;
    a first subtraction means that calculates and outputs a position deviation, based on said position command and the rotational position calculated based on the output from a rotation detection means for generating a pulse signal every time said motor rotates at a predetermined angle;
    a position control means that converts said position deviation to a speed command and outputs it;
    a second subtraction means that calculates and outputs a position deviation, based on said speed command and the rotational speed calculated based on the output from said rotation detection means;
    a speed control means that converts said speed deviation to a torque command and outputs it;
    a limiter that outputs said torque command as is when the level of said torque command is lower than a predetermined limit level or outputs said torque command of said limit level when the level of said torque command exceeds said limit level;
    a motor drive means that drives said motor based on said torque command from said limiter; and
    a voltage fluctuation detection means that detects voltage fluctuation of a power source which applies voltage to said motor drive means;
    wherein said position command output means is configured to, in response to the voltage fluctuation detection means detecting that the voltage of said power source has dropped below a predetermined reference level; vary said position command so as to reduce the rotation speed of said motor; and
    wherein said position control means is configured to, in response to the voltage fluctuation detection means detecting that the voltage of said power source has dropped below a predetermined reference level, limit said speed command to be output.

2. The motor control device as set forth in claim 1 wherein when said voltage fluctuation detection means detects that the voltage of said power source has recovered above said reference level, first said position command output means delays said position command so as to minimize said position deviation to be output from said first subtraction means, and then either said position command output means returns said position command to the original state at the position at which said position command output means has delayed said position command and/or said position control means cancels the limit on said speed command to be output.

3. The motor control device as set forth in claim 1 wherein when said voltage fluctuation detection means detects that the voltage of said power source has dropped below said reference level, said position command output means varies said position command so as to reduce the rotation speed of said motor; when said voltage fluctuation detection means detects that the voltage of said power source has recovered above said reference level, said position command output means delays said position command so as to minimize said position deviation to be output from said first subtraction means, and then said position command output means returns said position command to the original state at the position at which said position command output means has delayed said position command.

4. The motor control device as set forth in claim 1 wherein when said voltage fluctuation detection means detects that the voltage of said power source has dropped below said reference level, said position control means limits said speed command to be output; when said voltage fluctuation detection means detects that the voltage of said power source has recovered above said reference level, said position command output means delays said position command so as to minimize said position deviation to be output from said first subtraction means, and then said position control means cancels the limit on said speed command to be output.

5. A motor control method for controlling a motor that operates a robot,
   wherein a position deviation is calculated based on the position command for controlling said motor and the actual rotational position of said motor, said position deviation is converted to a speed command, the speed deviation is calculated based on said speed command and said actual rotational speed of said motor, and said speed deviation is converted to a torque command;
   when the value of said torque command is below a predetermined limit level, said motor is driven based on said torque command as is; when the value of said torque command exceeds said limit level, said motor is driven based on said torque command having said limit level as its value; and
   wherein, in response to a voltage of a power source of said motor dropping below a predetermined reference level, the rotation speed of said motor is reduced and said speed command is limited.

6. A motor control device for use with a power source and a motor including an encoder, the motor control device comprising:
   a voltage fluctuation unit configured to detect a voltage drop in which a voltage output by power source falls below a predetermined reference value;
   a position command unit configured to output a position command and, in response to the voltage fluctuation unit detecting the voltage drop, vary the positional command to reduce a rotational speed of the motor;
   a position detection unit configured to receive an output of the encoder and calculate a rotational position of the motor based on the output of the encoder;
   a first subtraction unit configured to receive the rotational position of the motor from the position detection unit and receive a positional command from the position command unit, the first subtraction unit being further configured to calculate a position deviation by subtracting the rotational position from the position command;
   a position control unit configured to receive the position deviation from the first subtraction unit and output a target rotational speed based on the position deviation, the position control unit being further configured to, in response to the voltage fluctuation unit detecting the voltage drop, limit the target rotational speed that is output;
   a speed detection unit configured to calculate a rotational speed of the motor based on the output of the encoder;
   a second subtraction unit configured to receive the rotational speed of the motor from the speed detection unit and the target rotational speed from the position control unit, the second subtraction unit being further configured to calculate a speed deviation by subtracting the rotational speed of the motor from the target rotational speed;
   a speed control unit configured to receive the speed deviation from the second subtraction unit and convert the speed deviation into a torque command;
   a limiter configured to receive the torque command control unit, compare the torque command to a predetermined torque limit, output the torque command if the torque command is below the predetermined torque limit, and output the predetermined torque limit if the torque command is equal to or greater than the predetermined torque limit; and
   a motor driver configured to receive the output of the limiter and apply a voltage from the power source to the motor based on output of the limiter.

7. The motor control device of claim 6, wherein the voltage fluctuation unit is configured to, after detection of the voltage drop below the predetermined reference value, detect a recovery in which the voltage output by the power source rises above the predetermined reference value;
   the position control unit is further configured to, in response to the recovery detected by the voltage fluctuation unit, cancel limiting the target rotational speed that is output.

* * * * *